(12) United States Patent
Endo

(10) Patent No.: US 8,035,692 B2
(45) Date of Patent: Oct. 11, 2011

(54) IMAGE TAKING APPARATUS WHICH FORMS AN IMAGE OF A SUBJECT ON AN IMAGING DEVICE TO CREATE IMAGE DATA REPRESENTATIVE OF THE SUBJECT

(75) Inventor: Hiroshi Endo, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 650 days.

(21) Appl. No.: 12/045,921

(22) Filed: Mar. 11, 2008

(65) Prior Publication Data

US 2008/0239084 A1  Oct. 2, 2008

(30) Foreign Application Priority Data

Mar. 30, 2007 (JP) .................................. 2007-094294
Jul. 26, 2007 (JP) .................................. 2007-194977

(51) Int. Cl.
*H04N 5/228* (2006.01)
(52) U.S. Cl. ..................................... 348/208.6
(58) Field of Classification Search ............... 348/208.4, 348/208.6, 208.16
See application file for complete search history.

(56) References Cited

U.S. PATENT DOCUMENTS

| | | | | |
|---|---|---|---|---|
| 2002/0097324 A1* | 7/2002 | Onuki | ........................... | 348/208 |
| 2004/0239771 A1* | 12/2004 | Habe | ........................ | 348/208.12 |
| 2007/0014554 A1* | 1/2007 | Sasaki et al. | .................... | 396/55 |
| 2007/0139536 A1* | 6/2007 | Watanabe | ................ | 348/231.99 |

FOREIGN PATENT DOCUMENTS

| | | | |
|---|---|---|---|
| JP | 04-309078 | A | 10/1992 |
| JP | 06-284327 | A | 10/1994 |
| JP | 11-252445 | A | 9/1999 |
| JP | 2000-341577 | A | 12/2000 |
| JP | 2005-130159 | A | 5/2005 |
| JP | 2006-262220 | A | 9/2006 |

* cited by examiner

*Primary Examiner* — Sinh Tran
*Assistant Examiner* — Albert Cutler
(74) *Attorney, Agent, or Firm* — Sughrue Mion, PLLC

(57) ABSTRACT

There is provided an image taking apparatus capable of preferably correcting both the camera shake and the subject shake in the still picture photography. The image taking apparatus has a system control section that determines whether a subject is a still subject or a dynamic subject. When the system control section determines that the subject is the still subject, the system control section instructs a timing generation section to cause an imaging section to generate a series of images, so that an image piling up section performs piling up of images in accordance with a computed result with a movement vector computing section. Thus, the camera shake is corrected. When the system control section determines that the subject is the dynamic subject, the system control section instructs the timing generation section to perform a single photography at a predetermined shutter time free from the subject shake.

6 Claims, 21 Drawing Sheets

IMAGE TAKING APPARATUS WHICH FORMS AN IMAGE OF A SUBJECT ON AN IMAGING DEVICE TO CREATE IMAGE DATA REPRESENTATIVE OF THE SUBJECT

BACKGROUND OF THE INVENTION

1. Field of the Invention

The present invention relates to an image taking apparatus having an imaging device or an image sensor, which forms an image of a subject on the imaging device to create image data representative of the subject.

2. Description of the Related Art

Hitherto, there is proposed a technology wherein a movement vector representative of the movement of two or more images is determined in accordance with those two or more images to correct the camera shake (for instance, refer to Japanese Patent Application Laid Open Gazette H06-284327, Japanese Patent Application Laid Open Gazette H11-252445, Japanese Patent Application Laid Open Gazette 2000-341577, Japanese Patent Application Laid Open Gazette 2005-130159, Japanese Patent Application Laid Open Gazette 2006-262220, and Japanese Patent Application Laid Open Gazette H04-309078). However, according to the technology disclosed in those Japanese patent documents, it is difficult to correct the subject shake. More in details, in the event that when the subject is divided into the main subject and the background, only the main subject moves, blurring of the main subject cannot be corrected.

By the way, it is reported to have succeeded in the development of the image sensor that is able to generate frames of the number of 300 pieces a minute with 1.2M (1.2 mega pixels) recently. The use of such an image sensor makes it possible to obtain many images, that is, pieces a second by raising the frame rate. Thus, piling up the image of each frame makes it possible to raise the S/N ratio so that high definition of still picture photography can be obtained. Further, it is possible to correct the camera shake by piling up images every frame while modifying position of individual image. Furthermore, the frame interval is shortened, it is possible to correct the subject shake some degree by piling up images every frame while modifying position of individual image.

However, according to the technologies as mentioned above, the camera shake and the subject shake are corrected without being distinguished. Thus, it is difficult to completely correct the subject shake. As disclosed in the document Japanese Patent Application Laid Open Gazette H04-309078, if it is possible to distinguish the subject shake and the camera shake from one another by determining movement vectors on individual areas where an image of two or more images repeatedly generated is divided into plural pieces of image and comparing images on individual areas with one another on a time sequential basis, it is possible to suppress the subject shake by hastening the speed of the shutter when the subject shake seems to be generated. However, the technology disclosed in Japanese Patent Application Laid Open Gazette H04-309078 relates to the dynamic picture and cannot be applied to the still picture.

SUMMARY OF THE INVENTION

In view of the foregoing, it is an object of the present invention to provide an image taking apparatus capable of solving the problem of the subject shake as mentioned above, and particularly of suitably correcting the subject shake and the camera shake in the still picture photography by distinguishing the subject shake and the camera shake from one another.

To achieve the above-mentioned objects, the present invention provides a first image taking apparatus that that images a subject on an imaging device to create an image representative of the subject, the image taking apparatus including:

through image creating means that repeatedly creates images before photography;

movement vector computing means that computes a movement vector for each of areas which are obtained by adjusting the images repeatedly created by the through image creating means is divided into two or more areas, between the two or more images;

designating means that designates a shooting mode from among two or more shooting modes;

subject determining means that determines whether the subject of a present photographic object is a still subject or a dynamic subject in accordance with the shooting mode designated by the designating means;

image taking means in which when the subject determined by the subject determining means is a dynamic subject, a photography is performed in accordance with a first shooting mode to create a single photographic image through increasing a photography sensitivity, and when the subject determined by the subject determining means is a still subject, a photography is performed in accordance with a second shooting mode to create a series of photographic images; and image piling up means that, when the subject determined by the subject determining means is a still subject, creates a piled up image by adjusting each position of two or more images obtained through performing the second shooting mode in accordance with the movement vectors computed by the movement vector computing means so that relative blurring is corrected between the two or more images, and then piling up the two or more images.

According to the first image taking apparatus, the movement vector computing means computes movement vectors on individual areas wherein each one of the images repeatedly created by the through image creating means is divided into two or more areas, and the subject determining means determines in accordance with the movement vectors computed by the movement vector computing means whether the subject is concerned with a still subject or a dynamic subject.

The image taking means performs an image taking operation in such a way that when the subject determining means determines that the subject is concerned with the dynamic subject, a photography is carried out in accordance with a first shooting mode to create a single one photographic image through raising a photographic sensitivity, and when the subject determining means determines that the subject is concerned with the still subject, a photography is carried out in accordance with a second shooting mode to create a series of photographic images. In other words, when the subject determining means determines that the subject is concerned with the dynamic subject, a photographic sensitivity is enhanced so that the photography is carried out with a shutter speed according to the high photographic sensitivity. Thus, this feature makes it possible to suppress the subject shake.

The image piling up means creates a piled up image in such a way that when the subject determining means determines that the subject is concerned with the still subject, two or more photographic images, which are obtained by an execution of the photography according to the second shooting mode, are corrected in positions of the photographic images so as to correct relative blurring among the photographic images in accordance with the movement vectors computed by the movement vector computing means, and then be piled up. In other words, when the subject determining means determines that the subject is concerned with the still subject, the image piling up means creates the piled up image. Thus, this feature makes it possible to correct the camera shake.

To achieve the above-mentioned objects, the present invention provides a second image taking apparatus that images a subject on an imaging device to create an image representative of the subject, the image taking apparatus including:

through image creating means that repeatedly creates images before photography;

movement vector computing means that computes a movement vector for each of areas which are obtained by adjusting the images repeatedly created by the through image creating means is divided into two or more areas, between the two or more images;

designating means that designates a shooting mode from among two or more shooting modes;

subject determining means that determines whether the subject of a present photographic object is a still subject or a dynamic subject in accordance with the shooting mode designated by the designating means;

image taking means in which when the subject determined by the subject determining means is a dynamic subject, a photography is performed in accordance with a first shooting mode to create a single photographic image through increasing a photography sensitivity, and when the subject determined by the subject determining means is a still subject, a photography is performed in accordance with a second shooting mode to create a series of photographic images; and image piling up means that, when the subject determined by the subject determining means is a still subject, creates a piled up image by adjusting each position of two or more images obtained through performing the second shooting mode in accordance with the movement vectors computed by the movement vector computing means so that relative blurring is corrected between the two or more images, and then piling up the two or more images.

According to the second image taking apparatus, the subject determining means that determines in accordance with the shooting mode designated by the designating means whether the subject of a present photographic object is concerned with a still subject or a dynamic subject, and the image taking means performs an image taking operation in such a way that when the subject determining means determines that the subject is concerned with the dynamic subject, a photography is carried out in accordance with a first shooting mode to create a single one photographic image through raising a photographic sensitivity, and when the subject determining means determines that the subject is concerned with the still subject, a photography is carried out in accordance with a second shooting mode to create a series of photographic images. In other words, when the subject determining means determines that the subject is concerned with the dynamic subject, a photographic sensitivity is enhanced so that the photography is carried out with a shutter speed according to the high photographic sensitivity. Thus, this feature makes it possible to suppress the subject shake.

The image piling up means that creates a piled up image in such a way that when the subject determining means determines that the subject is concerned with the still subject, two or more photographic images, which are obtained by an execution of the photography according to the second shooting mode, are corrected in positions of the photographic images so as to correct relative blurring among the photographic images in accordance with the movement vectors computed by the movement vector computing means, and then be piled up. In other words, when the subject determining means determines that the subject is concerned with the still subject, the image piling up means creates the piled up image in the manner as mentioned above. Thus, this feature makes it possible to correct the camera shake.

To achieve the above-mentioned objects, the present invention provides a third image taking apparatus that that images a subject on an imaging device to create an image representative of the subject, the image taking apparatus including:

blurring detection means that detects blurring of the image taking apparatus;

movement vector computing means that computes a movement vector for each of areas which are obtained by dividing each one of the images repeatedly created by the through image creating means into two or more areas, between the two or more images;

subject determining means that determines whether the subject is a still subject or a dynamic subject in accordance with the movement vectors computed by the movement vector computing means;

image taking means in which when the subject determined by the subject determining means is a dynamic subject, a photography is performed in accordance with a first shooting mode to create a single photographic image through increasing a photography sensitivity, and when the subject determined by the subject determining means is a still subject, a photography is performed in accordance with a second shooting mode to create a series of photographic images; and image piling up means that, when the subject determined by the subject determining means is a still subject, creates a piled up image by adjusting each position of two or more images obtained through performing the second shooting mode in accordance with a blurring detection result by the blurring detection means so that relative blurring is corrected between the two or more images, and then piling up the two or more images.

According to the first image taking apparatus, two or more photographic images are corrected in positions of the photographic images so as to correct relative blurring among the photographic images in accordance with the movement vectors computed by the movement vector computing means, and then be piled up. On the other hand, it is preferable to provide such an arrangement that a gyro-sensor is used as the blurring detection means to correct positions of the photographic images. This feature makes it possible to improve accuracy of the correction.

In view of the foregoing, according to the third image taking apparatus, the subject determining means determines in accordance with the movement vectors computed by the movement vector computing means whether the subject is concerned with a still subject or a dynamic subject. The image taking means performs an image taking operation in such a way that when the subject determining means determines that the subject is concerned with the dynamic subject, a photography is carried out in accordance with a first shooting mode to create a single one photographic image through raising a photographic sensitivity, and when the subject determining means determines that the subject is concerned with the still subject, a photography is carried out in accordance with a second shooting mode to create a series of photographic images. In other words, when the subject determining means determines that the subject is concerned with the dynamic subject, a photographic sensitivity is enhanced so that the photography is carried out with a shutter speed according to the high photographic sensitivity. Thus, this feature makes it possible to suppress the subject shake.

The image piling up means creates a piled up image in such a way that when the subject determining means determines that the subject is concerned with the still subject, two or more photographic images, which are obtained by an execution of the photography according to the second shooting mode, are corrected in positions of the photographic images so as to correct relative blurring among the photographic images in accordance with a blurring detection result by the blurring detection means, and then be piled up. In other words, when the subject determining means determines that the subject is concerned with the still subject, the image piling up means creates the piled up image in the manner as mentioned above. Thus, this feature makes it possible to correct the camera shake.

To achieve the above-mentioned objects, the present invention provides a fourth image taking apparatus that images a subject on an imaging device to create an image representative of the subject, the image taking apparatus including:

blurring detection means that detects blurring of the image taking apparatus;

designating means that designates a shooting mode from among two or more shooting modes;

subject determining means that determines whether the subject of a present photographic object is a still subject or a dynamic subject in accordance with the shooting mode designated by the designating means;

image taking means in which when the subject determined by the subject determining means is a dynamic subject, a photography is performed in accordance with a first shooting mode to create a single photographic image through increasing a photography sensitivity, and when the subject determined by the subject determining means is a still subject, a photography is performed in accordance with a second shooting mode to create a series of photographic images; and image piling up means that, when the subject determined by the subject determining means is a still subject, creates a piled up image by adjusting each position of two or more images obtained through performing the second shooting mode in accordance with a blurring detection result by the blurring detection means so that relative blurring is corrected between the two or more images, and then piling up the two or more images.

According to the second image taking apparatus, two or more photographic images are corrected in positions of the photographic images so as to correct relative blurring among the photographic images in accordance with the movement vectors computed by the movement vector computing means, and then be piled up. On the other hand, it is preferable to provide such an arrangement that a gyro-sensor is used as the blurring detection means to correct positions of the photographic images. This feature makes it possible to improve accuracy of the correction.

In view of the foregoing, according to the fourth image taking apparatus, the subject determining means determines in accordance with the shooting mode designated by the designating means whether the subject of a present photographic object is concerned with a still subject or a dynamic subject, and the image taking means that performs an image taking operation in such a way that when the subject determining means determines that the subject is concerned with the dynamic subject, a photography is carried out in accordance with a first shooting mode to create a single one photographic image through raising a photographic sensitivity, and when the subject determining means determines that the subject is concerned with the still subject, a photography is carried out in accordance with a second shooting mode to create a series of photographic images. In other words, when the subject determining means determines that the subject is concerned with the dynamic subject, a photographic sensitivity is enhanced so that the photography is carried out with a shutter speed according to the high photographic sensitivity. Thus, this feature makes it possible to suppress the subject shake.

The image piling up means creates a piled up image in such a way that when the subject determining means determines that the subject is concerned with the still subject, two or more photographic images, which are obtained by an execution of the photography according to the second shooting mode, are corrected in positions of the photographic images so as to correct relative blurring among the photographic images in accordance with a blurring detection result by the blurring detection means, and then be piled up. In other words, when the subject determining means determines that the subject is concerned with the still subject, the image piling up means creates the piled up image in the manner as mentioned above. Thus, this feature makes it possible to correct the camera shake.

In the image taking apparatus according to the present invention as mentioned above, it is preferable that the image taking apparatus further includes:

subject brightness detection means that detects a brightness of the subject; and proper shutter time computing means that computes a proper shutter time to perform a photography with a proper exposure in accordance with the brightness of the subject detected by the subject brightness detection means, wherein when the proper shutter time computed by the proper shutter time computing means is shorter than a predetermined shutter time, the image taking means performs a photography in accordance with a third shooting mode to create a single photographic image according to the proper shutter time without waiting for a determination result of the subject determining means, and when the proper shutter time computed by the proper shutter time computing means is longer than a predetermined shutter time, the image taking means quickens the shutter time to the predetermined shutter time and performs a photography in accordance with the first shooting mode or the second shooting mode.

The camera shake and the subject shake occur when the shutter time is longer than a predetermined shutter time. Thus, it is effective to provide such an arrangement that when the proper shutter time, which is computed by the proper shutter time computing means, is shorter than a predetermined shutter time, the image taking means performs an image taking operation in accordance with a third shooting mode to create a single one photographic image according to the proper shutter time, without waiting for a determining result of the subject determining means, and when the proper shutter time, which is computed by the proper shutter time computing means, is longer than a predetermined shutter time, the image taking means performs an image taking operation in accordance with the first shooting mode or the second shooting mode, upon quickening the shutter time to the predetermined shutter time.

In the image taking apparatus according to the present invention as mentioned above, it is preferable that the image taking apparatus further includes notification means that notifies a user of a determination result by the subject determining means.

This feature makes it possible for a user to confirm on the display screen whether the image taking apparatus determines that the subject is concerned with a still subject or a dynamic subject.

In the image taking apparatus according to the present invention as mentioned above, it is preferable that the image taking apparatus further includes recording means that records information indicative of a matter as to whether it is concerned with an image obtained by execution of the first shooting mode or an image obtained by execution of the second shooting mode, in association with the photographic image obtained by execution of the first shooting mode and the plied up image obtained by execution of the second shooting mode.

This feature makes it possible for a user to analyze inconveniences of images referring to the above-mentioned information, looking the reproduced image.

According to the first image taking apparatus to the fourth image taking apparatus according to the present invention as mentioned above, there is disclosed an arrangement in which it is determined before photography as to whether the subject is concerned with a still subject or a dynamic subject. However, it is acceptable that it is determined whether the subject is concerned with a still subject or a dynamic subject, using two or more images obtained through photography.

Thus, to achieve the above-mentioned objects, the present invention provides a fifth image taking apparatus that that images a subject on an imaging device to create an image representative of the subject, the image taking apparatus including:

image taking means responsive to a photographic operation to create a series of photographic images;

image piling up means that creates a piled up image by piling up relatively low sensitivity of images, which are obtained through the photographic operation the image taking means so that blurring on the images is corrected;

high sensitive image creating means that creates a relatively high sensitive image which is one of the images obtained through an photography operation of the image taking means;

movement vector computing means that computes a movement vector for each of areas which are obtained by dividing each one of the images created by the image taking means two or more areas between the two or more images;

subject determining means that determines whether the subject of two or more images obtained through a present photography is a still subject or a dynamic subject in accordance with the movement vectors computed by the movement vector computing means;

image recording means in which the high sensitive image created by the high sensitive image creating means is increased when the subject determining means determines that the subject is a dynamic subject, and the piled up image created by the image piling up means is increased when the subject determining means determines that the subject is a still subject.

According to the fifth image taking apparatus according to the present invention as mentioned above, the subject determining means determines in accordance with the movement vectors computed by the movement vector computing means whether the subject of two or more images obtained through a present photography is concerned with a still subject or a dynamic subject, and the image recording means records the high sensitivity of image which is created with the high sensitivity image creating means when the subject determining means determines that the subject is concerned with a dynamic subject, and records the piled up image which is created with the image piling up means when the subject determining means determines that the subject is concerned with a still subject.

In other words, according to the fifth image taking apparatus according to the present invention as mentioned above, in the still picture photography, it is possible to perform a preferable photography through distinction between the camera subject and the subject shake in accordance with the subject. Thus, it is possible to implement an image taking apparatus capable of preferably correcting both the camera shake and the subject shake in the still picture photography.

In the image taking apparatus according to the present invention as mentioned above, it is preferable that the subject determining means determines that when the subject moves not more than a predetermined amount of migration during a photography for the two or more images or when the subject moves more than the predetermined amount of migration, the subject is a still subject or a dynamic subject in accordance with the movement vector computed by the movement vector computing means, respectively.

In the image taking apparatus according to the present invention as mentioned above, it is preferable that the image taking apparatus further includes face detection means that detects whether the subject includes a face, the movement vector computing means computes a movement vector when the subject includes a face, and the subject determining means determines that when the subject includes no face, the subject is a still subject, and when the subject includes a face, the subject determining means determines in accordance with the movement vectors computed by the movement vector computing means whether the subject is a still subject or a dynamic subject.

In the image taking apparatus according to the present invention as mentioned above, it is preferable that the image piling up means piles up the two or more images obtained through the photographic operation of the image taking means so that blurring on the images is corrected, in accordance with the movement vector computed by the movement vector computing means.

In the image taking apparatus according to the present invention as mentioned above, it is preferable that the image taking apparatus further includes an angular velocity sensor that detects an angular velocity of the image taking apparatus, and the image piling up means piles up two or more images, which are obtained through the photographic operation of the image taking means, so that blurring on the images is corrected, in accordance with the angular velocity detected by the angular velocity sensor.

In the image taking apparatus according to the present invention as mentioned above, it is preferable that the image recording means records the high sensitivity of image or the piled up image with applying information indicative of whether the image to be recorded now is the high sensitivity of image or the piled up image.

DETAILED DESCRIPTION OF PREFERRED EMBODIMENTS

Embodiments of the present invention will be described with reference to the accompanying drawings.

Figure 1:
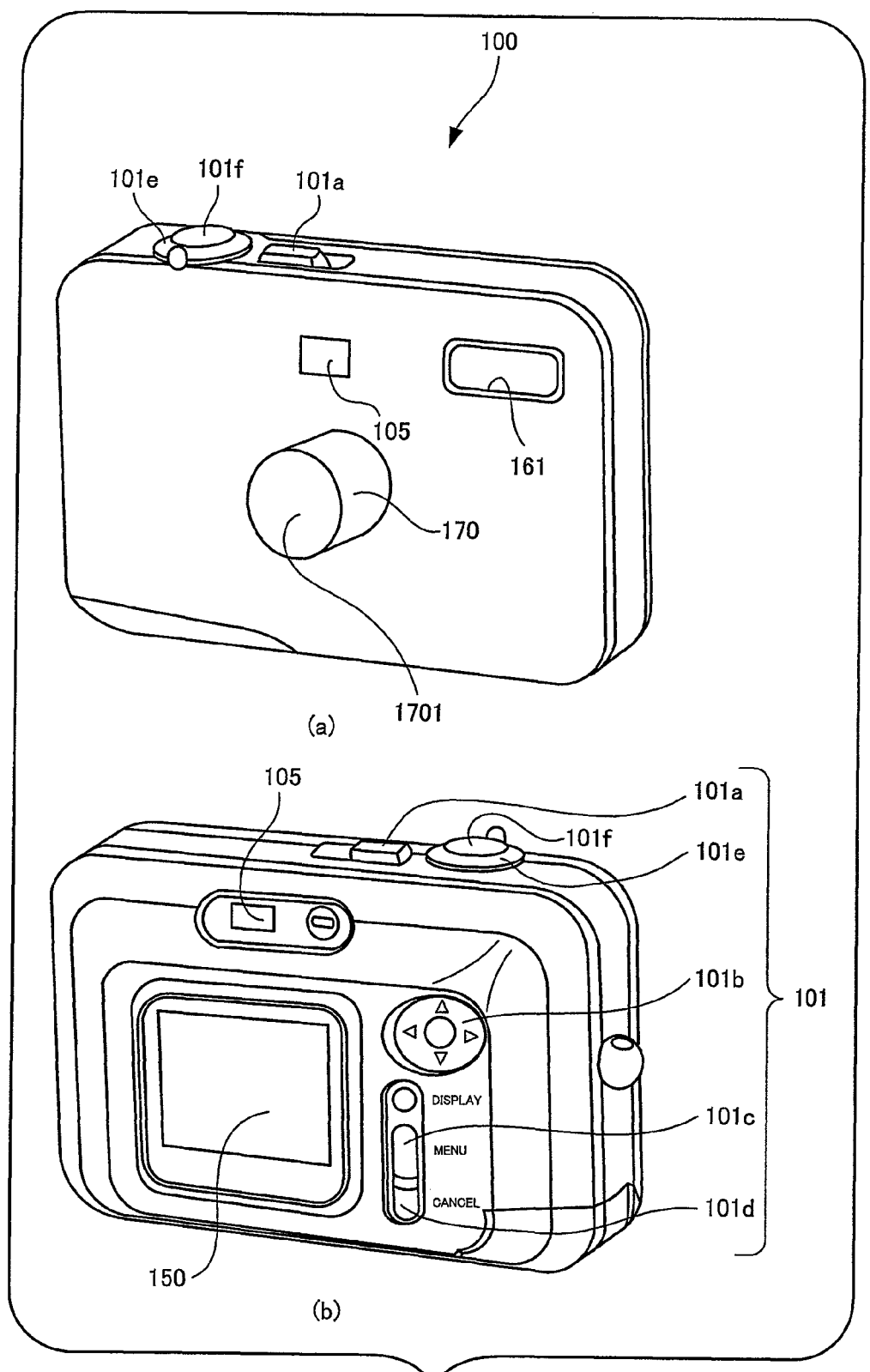
FIG. 1 is a perspective view of a digital camera, which is one embodiment of an image taking apparatus of the present invention.

FIG. 1 is a perspective view of a digital camera, which is one embodiment an image taking apparatus of the present invention.

FIG. 1 shows a perspective view of a digital camera 100 of an embodiment of the present invention. A part (a) of FIG. 1 shows a perspective view of the digital camera 100 looking from the upper side of the front. A part (b) of FIG. 1 shows a perspective view of the digital camera 100 looking from the upper side of the back.

As seen from the part (a) of FIG. 1, the digital camera 100 has a lens barrel 170 incorporating therein an image taking lens 1701 at the center of the body of the camera, and a viewfinder 105 at the upper side of the lens barrel 170. A photography auxiliary light luminescence window WD is prepared for sideward of the viewfinder 105.

As seen from the part (b) of FIG. 1, at the back side and the upper side of the digital camera 100, there is prepared a handler group 101 of doing various operations when a user uses the digital camera 100.

The handler group 101 includes a power supply switch 101a to operate the digital camera 100, a cross key 101b, a menu/OK key 101c, a cancellation key 101d, and a mode selection lever 101e. The mode selection lever 101e serves to switch between a reproduction mode and a shooting mode, and further serves to switch between an animation mode and a still picture mode in the shooting mode. When the power supply switch 101a turns on in a state that the mode selection lever 101e is switched to the shooting mode, a through picture is displayed on a display screen 150. Taking a picture of the subject is carried out when a release button 101f is depressed while seeing the through picture at the shutter chance. In the state that the mode selection lever 101e is switched to a reproduction side, a photographic image is subjected to a reproduction display on the display screen 150. The release button 101f has two operating modes of half-depression and full-depression.

Figure 2:
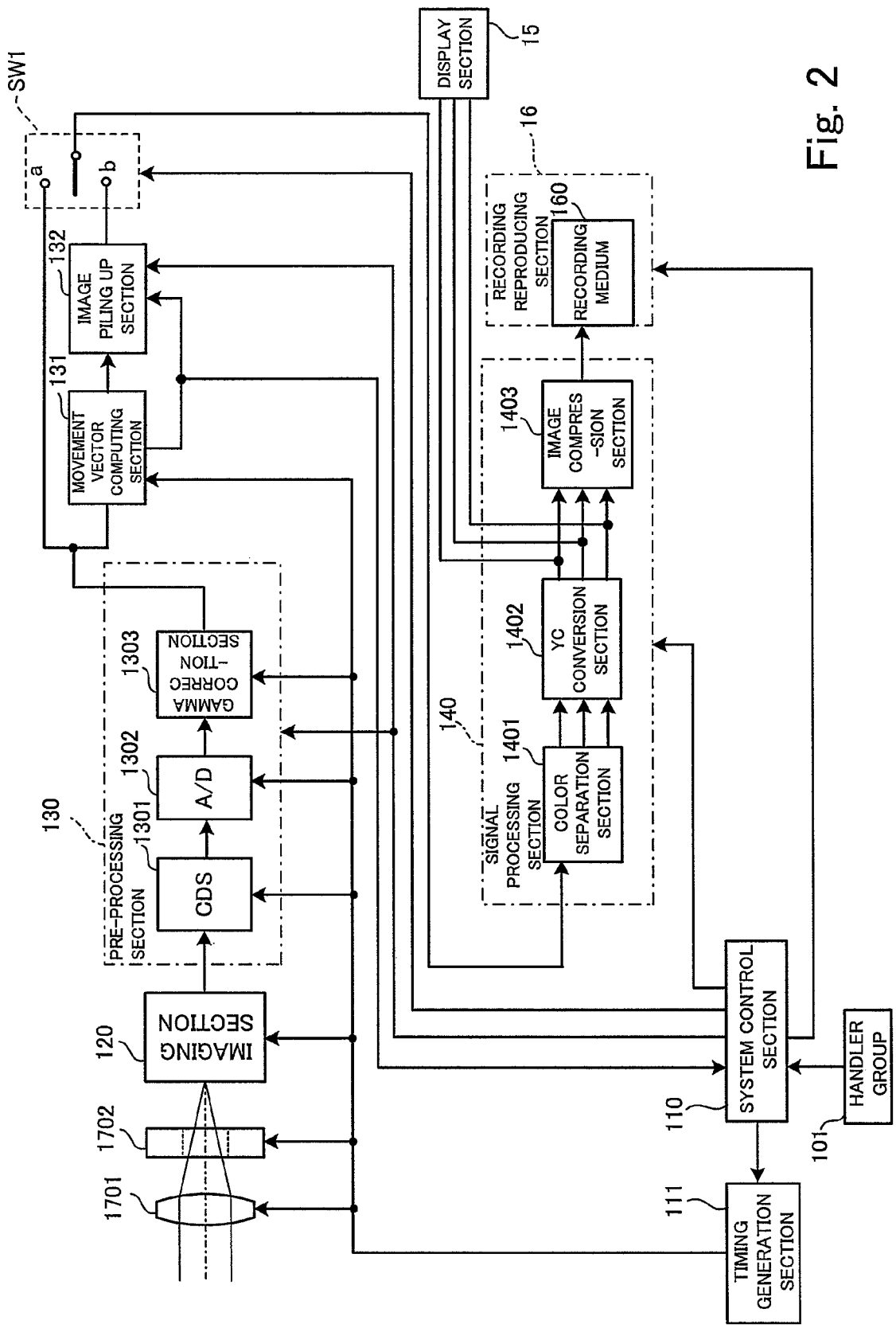
FIG. 2 is a functional block diagram of the electrical system of the digital camera 100 of FIG. 1.

FIG. 2 is a functional block diagram of the electrical system of the digital camera 100 of FIG. 1.

The digital camera 100 is controlled in all processing by a system control section 110.

An input section of the system control section 110 may receive operative signals from the handler group 101 shown in the part (b) of FIG. 1. When the input section of the system control section 110 receives at least one of the operative signals, the system control section 110 executes the processing according to the received operative signal. The system control section 110 has ROM (not illustrated) which serves as a program memory. The ROM stores therein a program necessary so that the digital camera 100 may work as an image taking apparatus. The program stored in the ROM runs even when the power supply switch 101a is turned off, and waits for turning on of the power supply switch 101a. When the power supply switch 101a of the handler group 101 (cf. FIG. 1) turns on in this waiting state, the system control section 110 detects turn on of the power supply switch 101a, so that processing of controlling the movement of the digital camera according to the procedure of the program in the ROM is begun. An electrical power is always supplied from a battery (not illustrated) to the system control section 110.

Hereinafter, there will be explained the operation of the digital camera 100 after the power supply switch 101a (Refer to FIG. 1) of the handler group 101 is turned on, referring to FIG. 2.

According to the digital camera 100, in the event that the power supply switch 101a turns on and the mode selection lever 101e is switched to the shooting mode, the through picture is displayed on the display screen 150 of a display section 15. Accordingly, first of all, there will be explained processing for display of the through picture, and then there will be explained shooting processing to be carried out in response to depression of the release button 101f.

First of all, there will be explained processing where the through picture is displayed on the display screen 150.

When the system control section 110 detects the turn-on of the power supply switch 101a of the handler group 101, the electrical power is supplied from the battery to individual blocks. In the event that the mode selection lever 101e is switched to the shooting mode when the power supply switch 101a turns on, a timing signal that sets an electronic shutter and an image reading signal are supplied from a timing generation section 111 to an imaging section 120 incorporating an image sensor at prescribed intervals under the control of the system control section 110, and image signals are thinned out, so that the signals subjected to the thinning out are output from the imaging section 120 to a pre-processing section 130 at prescribed intervals. The imaging section 120 is provided with a color filter and the like as well as the image sensor. The digital camera 100 has an aperture adjustment mechanism 1702 capable of adjusting the diameter of an aperture so as to adjust the diameter of the aperture together with the electronic shutter of the imaging section 120 at the time of the exposure adjustment.

The pre-processing section 130 includes CDS 1301, A/D 1302, and a gamma correction section 1303. The CDS 1301 performs reduction processing for noises on image signals. The A/D 1302 receives an image of the analog signal outputted from the CDS 1301 and performs processing for conversion from an analog image signal to a digital image signal. The gamma correction section 1303 converts the image subjected to the conversion processing to an image suitable for gamma characteristics of the display screen 150.

The digital image signal, which is subjected to the processing in the pre-processing section 130, is fed via a switch SW1 to a signal processing section 140. The switch SW1 is usually switched to a code "a" side.

The signal processing section 140, to which images are fed from the pre-processing section 130, includes a color separation section 1401, a YC conversion section 1402, and an image compression section 1403. The color separation section 1401 separates an image into color signals of red (R), green (G) and blue (B). The YC conversion section 1402 converts individual color signals into YCC signals in accordance with a color conversion matrix. The images, which are subjected to the signal processing, are supplied to the display section 15.

The image reading signal is supplied from the timing generation section 111 to the imaging section 120 at prescribed intervals. Accordingly, whenever the images on the display screen 150 are switched at a predetermined timing, the image on the display screen 150 is switched so that an image, which is caught by a lens 1701 of a lens barrel 170, is displayed on the display screen 150 in form of the through image. When the through image is displayed on the display screen 150, the system control section 110 receives the supply of the digital image signal output from the A/D 1302 and always performs the exposure adjustment and the focus adjustment.

When the release button 101f is depressed on a half-depression basis, image taking processing starts.

When the release button 101f is depressed on a half-depression basis, the system control section 110 executes AE (Auto Exposure) processing and AF (Auto Focus) processing. The proper shutter time is computed by the AE processing. When the system control section 110 judges that the proper shutter time is shorter than a prescribed shutter time which becomes a standard where the camera shake and the subject shake are generated, the system control section 110 instructs the timing generation section 111 to expose the image sensor of the imaging section 120 with an electronic shutter at the proper shutter time. And the system control section 110 instructs the timing generation section 111 to supply a read signal to the imaging section 120 so as to output an image signal from the imaging section 120 after the proper shutter time, and output the image signal to the pre-processing section 130. The image signal, which is subjected to processing for noise reduction and the like with the pre-processing section 130, is supplied to the signal processing section 140. The image signal, which is subjected to processing for the signal processing with the signal processing section 140, is recorded onto a recording medium 160 of a recording reproduction section 16. The image taking processing, which is to be carried out where the subject brightness is bright to some degree and the proper shutter time obtained by the AE processing is shorter than prescribed shutter time, corresponds to the processing of the third shooting mode referred to in the present invention.

According to the present embodiment, in order to achieve the object of the present invention, there is provided an arrangement in which there is provided a movement vector computing section 131 that determines movement vectors on individual areas where each image of images of through pictures repeatedly generated is divided into two or more pieces, and the through pictures are always supplied to the movement vector computing section 131 so that it is possible to immediately judges whether the subject is a still subject or a dynamic subject even if the release button 101f is pushed any time.

In other words, according to the present embodiment, the through picture is supplied to the movement vector computing section 131 as well as the display section 15. The movement vector computing section 131 always computes movement vectors on individual areas where each image of images of through pictures, which are repeatedly generated in synchronism with the timing signal generated from the timing generation section 111, is divided into two or more pieces. When the release button 101f is depressed on a half-depression basis, the system control section 110 judges whether the subject is a still subject or a dynamic subject. In the event that the shutter time exceeds a predetermined value, there is a possibility that the camera shake or the subject shake will occur. Thus, in order to correct those sorts of blurring, the image taking processing is executed providing for the full-depression.

Here, there will be explained the image taking processing the third shooting mode as mentioned above, which is to be executed in the system control section 110.

If the release button 101f is pushed on a half-depression basis when the through image is displayed, the system control section 110 starts the image taking processing. At that time, upon receipt of a computing result of the movement vector of the movement vector computing section 131, the system control section 110 judges whether the subject is concerned with the still subject or the dynamic subject. In the event that it is necessary to take a picture at a shutter time that exceeds a prescribed shutter time to supplement brightness shortage, when the system control section 110 judges that the subject is concerned with the dynamic subject in accordance with the movement vector among individual images of the through image where the release button 101f is pushed on a half-depression basis, the system control section 110 sets a first shooting mode to create a single photographic image providing for a full-depression. On the other hand, when the system control section 110 judges that the subject is concerned with the still subject, the system control section 110 sets a second shooting mode to create two or more consecutive photographic images providing for a full-depression.

Here, there will be explained processing of correcting the camera shake wherein the system control section 110 judges that the subject is concerned with the still subject, so that the system control section 110 sets the second shooting mode and executes the photography according to the second shooting mode.

After the system control section 110 sets the second shooting mode when the release button 101f is pushed on a half-depression basis, the system control section 110 instructs the timing generation section 111 to repeatedly supply the electronic shutter short in the shutter time to the imaging section 120, when the release button 101f is pushed on a full-depression basis, so that the image sensor of the imaging section 120 consecutively creates photographic images and sequentially output image signals representative of the photographic images to the pre-processing section 130. At that time, the switch SW1 is switched to the side "b". The CDS 1301 of the pre-processing section 130 performs noise reduction processing and the like in every multi-page photography by once photographic operation, and the A/D 1302 converts an image of an analog signal, which is subjected to the noise reduction processing, to an image of a digital signal. The gamma correction section 1303 applies the gamma correction to the image converted to the digital signal with the A/D 1302. The image of the digital signal, which is subjected to the gamma correction, is fed to the movement vector computing section 131. The movement vector computing section 131 computes the movement vector among individual images. An image piling up section 132 performs piling up of images in accordance with the computed result with the movement vector computing section 131. The photographic image after piling up of images, or the photographic image after correction of the camera shake is output to the signal processing section 140.

In the signal processing section 140, the color separation section 1401 performs a color separation (RGB signals) of an image, the YC conversion section 1402 performs conversion processing from RGB signals to YCC signals, and the image compression section 1403 performs compression of an image, so that the YCC signals and compression information are recorded in form of an image file on the recording medium 160 of the recording reproduction section 16.

Thus, in the event that the system control section 110 decides that the subject is concerned with the still subject, the image piling up section 132 corrects the camera shake in accordance with the computed result of the movement vector computing section 131, so that the photographic image corrected in the camera shake is recorded on the recording medium 160 of the recording reproduction section 16.

According to the present embodiment, the through image creating means referred to in the present invention includes the system control section 110, the timing generation section 111, and the imaging section 120, the subject determining means referred to in the present invention includes the system control section 110, and the image taking means referred to in the present invention includes the system control section 110, the timing generation section 111, and the imaging section 120.

Next, there will be explained processing for a first shooting mode which is to be executed by the system control section 110 where the subject is concerned with the dynamic subject.

In the event that the system control section 110 decides that the subject is concerned with the dynamic subject when the shutter time is longer than a predetermined shutter time because the subject brightness is dark owing to the AE processing according to the half-depression, the system control section 110 sets the first shooting mode in view of the possibility of occurrence of the subject shake. Next, in response to the full-depression of the release button 101f, the system control section 110 instructs the imaging section 120 to raise a photographic sensitivity and instructs the timing generation section 111 to execute the photography according to the first shooting mode in which a single sheet of photographic image is created at the shutter speed according to the photographic sensitivity.

At that time, the system control section 110 switches the switch SW1 to the "a" side to directly supply the image signal output from the pre-processing section 130 to the signal processing section 140 so that the image signal, which is subjected to the signal processing, is recorded on the recording medium 160.

Thus, when the system control section 110 decides that the subject is concerned with the dynamic subject, the photographic sensitivity is raised, a photography, which is suppressed in the subject shake, is performed at the shutter speed according to the photographic sensitivity.

Here, there will be explained image taking processing to be executed by the system control section 110.

Figure 3:
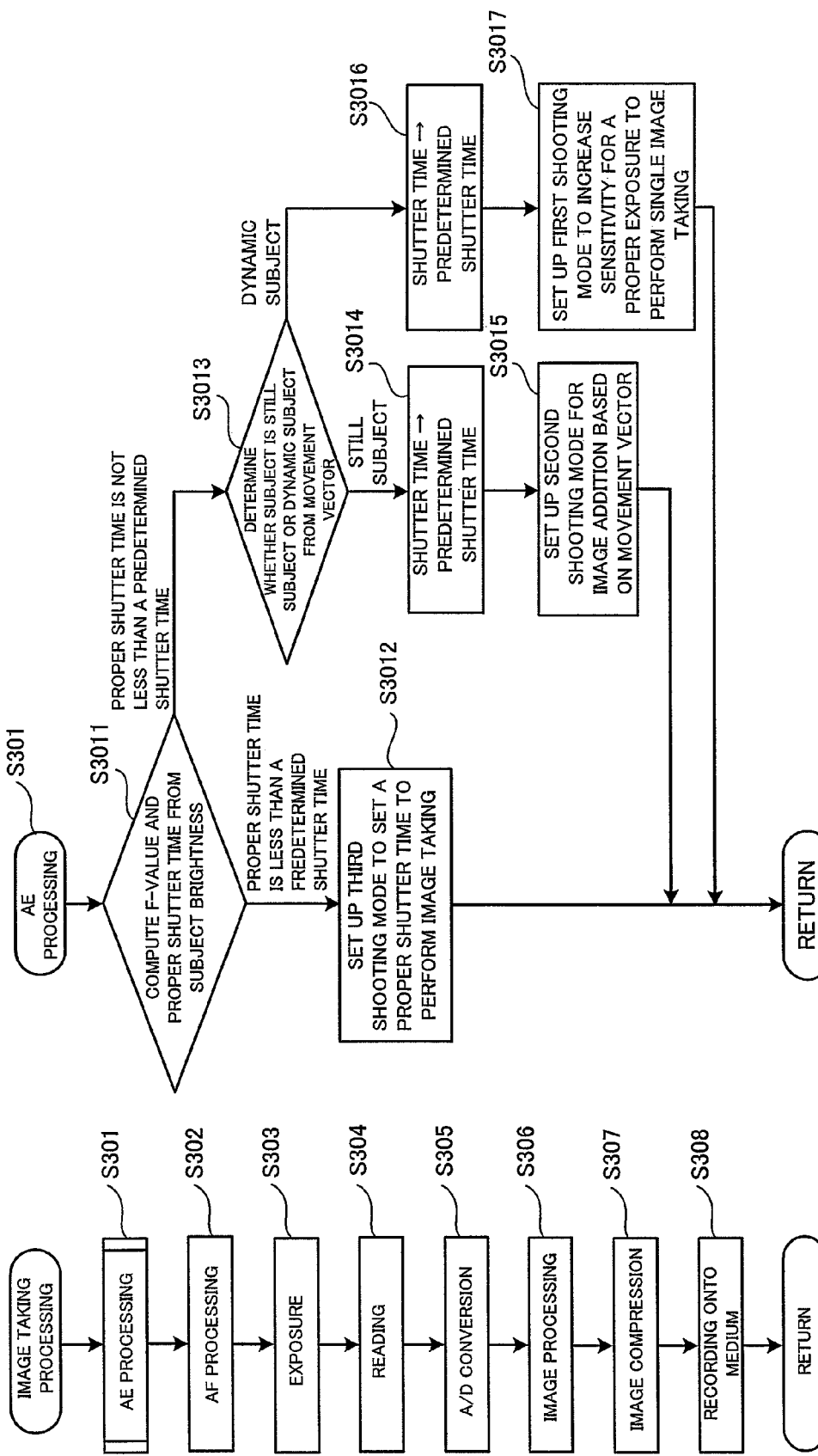
FIG. 3 is a flowchart useful for understanding procedure of image taking processing of the system control section 110.

FIG. 3 is a flowchart useful for understanding procedure of image taking processing of the system control section 110. A part (a) of FIG. 3 shows procedure of image taking processing. A part (b) of FIG. 3 shows details of processing of step S301 of the part (a) of FIG. 3.

The processing of this flow starts when the release button 101f is depressed on a half-depression basis.

When the release button 101f is depressed on a half-depression basis, the process goes to a step S301 wherein the AE, that is, the exposure processing is performed, and then goes to a step S302 wherein AF processing is performed.

When the release button 101f is depressed on a full-depression basis, the process goes to a step S303 wherein the shutter time set with the processing in the step S301 is set up to the imaging section 120 so that the image sensor of the imaging section 120 is exposed. When the exposure is terminated after the shutter time set in the step S301, the process goes to a step S304 wherein the timing generation section 111 instructs to supply a read signal to the imaging section 120 so as to output an image to the pre-processing section 130. In a step S305, the A/D 1302 of the pre-processing section 130 performs A/D conversion and the like and supplies the image converted into the digital signal via the movement vector computing section 131 and the image piling up section 132, or directly to the signal processing section 140. In a step S306, the signal processing section 140 performs the image processing. In a step S307, the image compression section 1403 of the signal processing section 140 performs the compression processing. In a step S308, an image is recorded on the recording medium 160. Thus, the processing of this flow is terminated.

In the event that the processing of the third shooting mode is executed, it is permitted that the subject brightness is light in some degree and the shutter time is set to be shorter than a predetermined value. However, in the event that it is detected in the processing of the step S301 that the subject brightness is dark, the proper shutter time may exceed a predetermined shutter time. This feature makes it easy to bring about the camera shake and the subject shake.

In view of the foregoing, according to the present embodiment, there is provided such an arrangement that the system control section 110 previously determines that any image taking processing of the first shooting mode, the second shooting mode, and the third shooting mode is to be executed in accordance with whether the proper shutter time, which is computed in accordance with subject brightness in the step S301, and the image taking processing is executed in the step S303 in the determined shooting mode determined in the step S301.

Next, there will be explained details of processing of the step S301 in conjunction with a part (b) of FIG. 3, since the AE processing of the step S301 is processing in which the system control section 110 performs the processing of computing the aperture value (F value) and the proper shutter time of the electronic shutter in accordance with the subject brightness.

First of all, in a step S3011, F value and the proper shutter time are computed in accordance with the subject brightness. When it is judged in a step S3011 that the proper shutter time is less than a predetermined shutter time, the process goes to a step S3012 in which there is set the third shooting mode wherein a proper shutter time is set to perform a single photography, and then returns to the step S302 of the part (a) of FIG. 3.

When it is judged in the step S3011 that the proper shutter time is above than a predetermined shutter time, the process goes to a step S3013 in which it is judged whether the subject is concerned with the still subject or the dynamic subject in accordance with the computing result of the movement vector computing section 131. In the step S3013, when it is decided that the subject is concerned with the still subject, the process goes to a step S3014 in which the shutter time is set to a predetermined shutter time, and then goes to a step S3015 in which the second shooting mode for creating consecutive two or more photographic images is set in such a way that the switch SW1 is switched to "b" side so that the image piling up section 132 performs piling up of images in accordance with the computed result with the movement vector computing section 131. Then, the process returns to the step S302 of the part (a) of FIG. 3. It is noted that the wording "image addition" appearing in the description of the step S3015 denotes the wording "piling up of images".

In the step S3013, when it is decided that the subject is concerned with the dynamic subject, the process goes to a step S3016 in which the proper shutter time is set to a predetermined shutter time, and then goes to a step S3017 in which the first shooting mode for creating single photographic image is set in such a way that the switch SW1 is switched to "a" side. Then, the process returns to the step S302 of the part (a) of FIG. 3.

When the release button 101f is pushed on a full-depression basis, the process goes to the step S303 in which the image taking processing is executed in the shooting mode which is set in the step S301.

Thus, when it is decided that the proper shutter time is above than a predetermined shutter time, the system control section 110 judges whether the subject is concerned with the still subject or the dynamic subject in accordance with the computing result of the movement vector computing section 131. Thus, in the photographic scene where the subject shake will occur, the execution of photography in the first shooting mode raises a photographic sensitivity and the photography is carried out at the shutter speed according to the a photographic sensitivity, so that the subject shake is suppressed. On the other hand, in the photographic scene where the camera shake will occur, the execution of photography in the second shooting mode performs consecutive two or more sheets of photography and the image piling up section 132 performs piling up of images, so that the camera shake is corrected.

As mentioned above, according to the present embodiment, there is implemented an image taking apparatus capable of preferably correcting both the camera shake and the subject shake in the still picture photography.

According to the present embodiment, the movement vector computing section 131 computes the movement vector using the through image and the system control section 110 judges whether the subject is concerned with the still subject or the dynamic subject in accordance with the computing result of the movement vector computing section 131. However, it is acceptable that when the shooting mode, which is loaded on the usual digital camera, is the scenery mode, it is concerned with the scenery photography, and thus it is decided that the subject is concerned with the still subject, and when the shooting mode is the portrait mode or the sport mode, it is concerned with the portrait photography, and thus it is decided that the subject is concerned with the dynamic subject. This feature makes it possible to automatically set the first shooting mode or the second shooting mode in accordance with the shooting mode of the digital camera.

Figure 4:
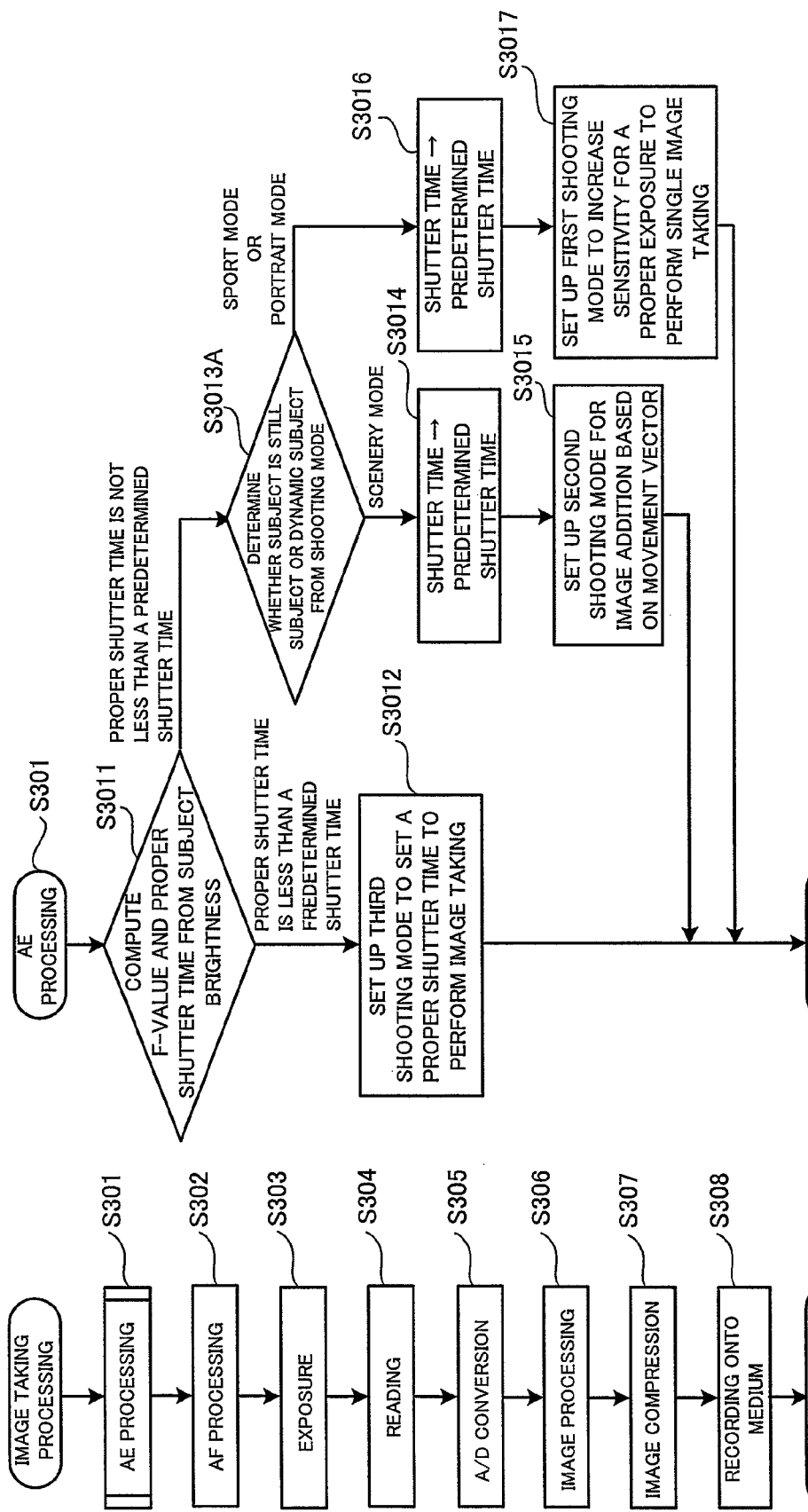
FIG. 4 is a functional block diagram useful for understanding a second embodiment of an image taking apparatus of the present invention.

FIG. 4 is a functional block diagram useful for understanding a second embodiment of an image taking apparatus of the present invention.

According to the second embodiment of an image taking apparatus of the present invention, it is assumed that there is used a digital camera having the external appearance of FIG. 1 and the internal structure of FIG. 2.

FIG. 4 shows a flowchart useful for understanding a processing procedure wherein it is determined in accordance with the shooting mode whether the subject is concerned with the still subject or the dynamic subject.

The processing content of the step S3013 of the part (b) of FIG. 3, which is to be executed by the system control section 110 (refer to FIG. 2) in accordance with the computed result of the movement vector computing section 131, is replace by the processing content of a step S3013A in FIG. 4.

As seen from FIG. 4, according to the present embodiment, instead of the computed result of the movement vector computing section 131, when the shooting mode is the scenery mode, the second shooting mode is set, and when the shooting mode is the portrait mode or the sport mode, the first shooting mode is set. According to the present embodiment, the system control section 110, which constitutes the subject determining section referred to in the present invention, judges whether the subject is concerned with the still subject or the dynamic subject in accordance with the shooting mode set with the mode selection lever 101e instead of judging whether the subject is concerned with the still subject or the dynamic subject in accordance with the computing result of the movement vector computing section 131. In other words, according to the present embodiment, the movement vector computing section 131 serves to supply the movement vector to the movement vector computing section 131 to create the piled up image. This feature also makes it possible to obtain the same effect as the first embodiment.

Figure 5:
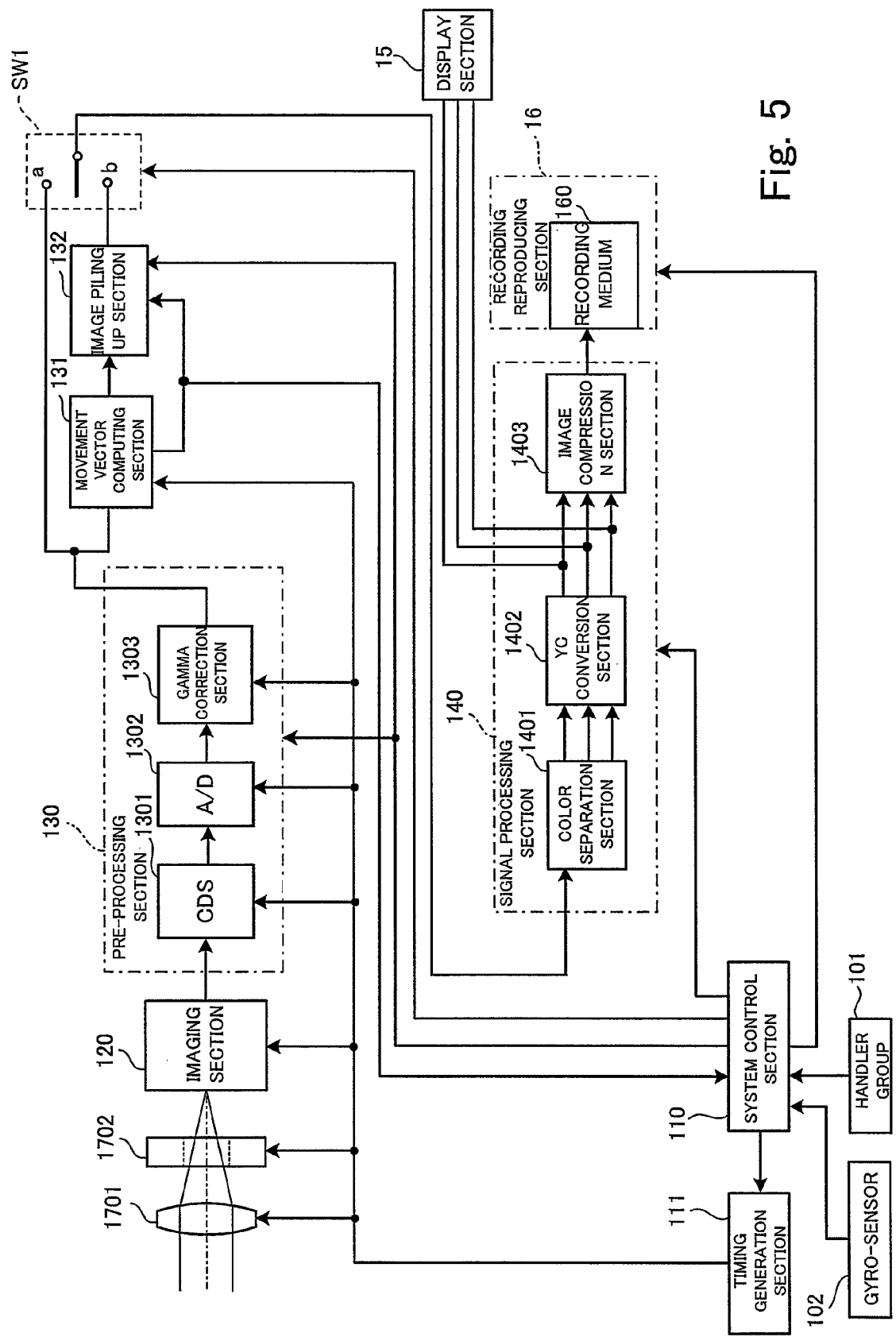
FIG. 5 is a functional block diagram useful for understanding a third embodiment of an image taking apparatus of the present invention.
Figure 6:
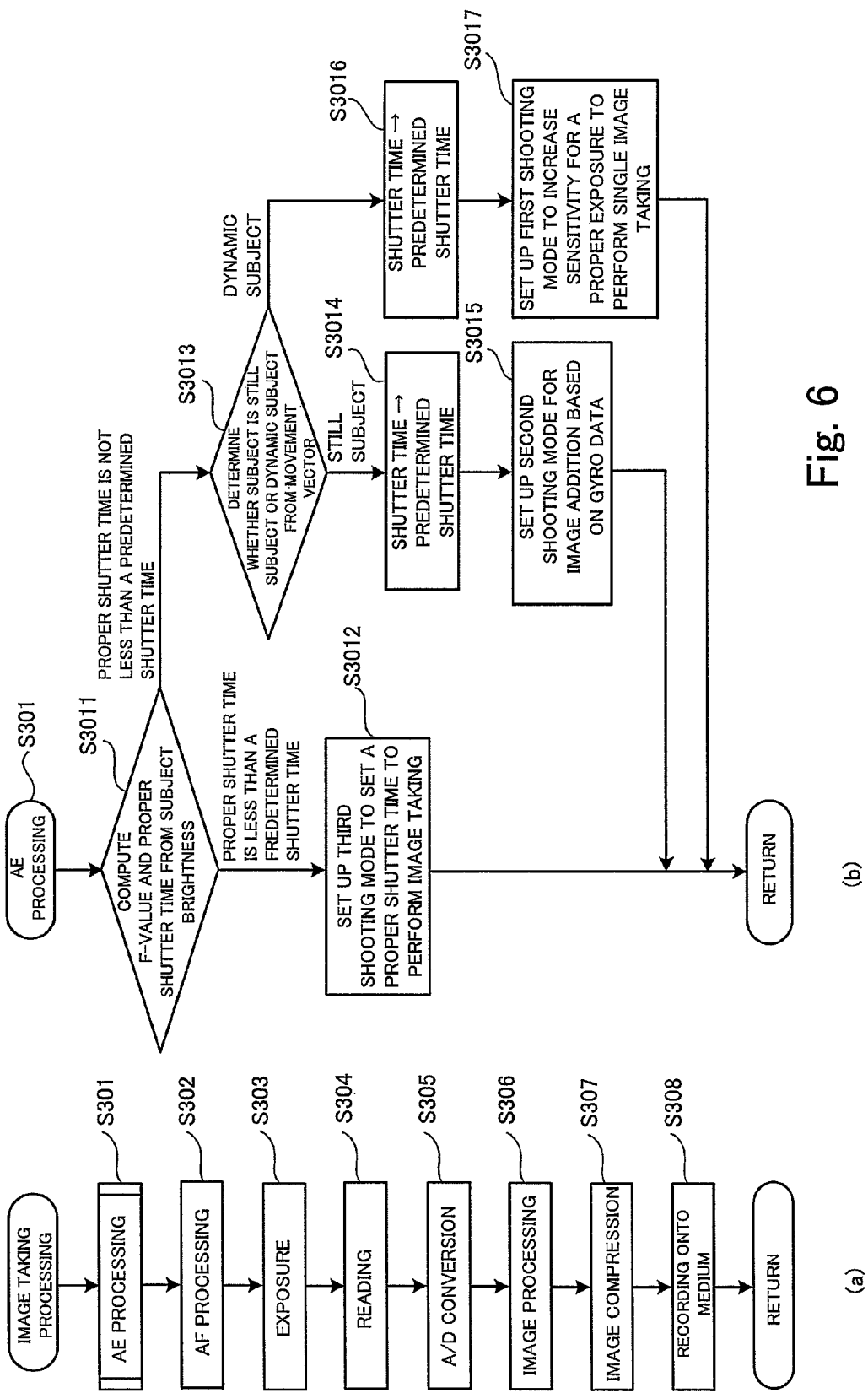
FIG. 6 is a functional block diagram useful for understanding the third embodiment of an image taking apparatus of the present invention.

FIG. 5 is a functional block diagram useful for understanding a third embodiment of an image taking apparatus of the present invention. FIG. 6 is a functional block diagram useful for understanding the third embodiment of an image taking apparatus of the present invention.

FIG. 5 shows an example in which a gyro-sensor 102 is added to the structure of FIG. 2. FIG. 6 shows an example in which the processing of the step S3015 of the part (b) of FIG. 3 is replace by the processing of a step S3015A in FIG. 6.

According to the first embodiment, the image piling up section 132 performs piling up of images in accordance with the computed result with the movement vector computing section 131. To the contrary, according to the embodiment shown in FIG. 5 and FIG. 6, the image piling up section 132 performs piling up of images in accordance with the gyro-sensor 102. The use of the gyro-sensor 102 makes it possible to improve the accuracy of the blurring.

Figure 7:
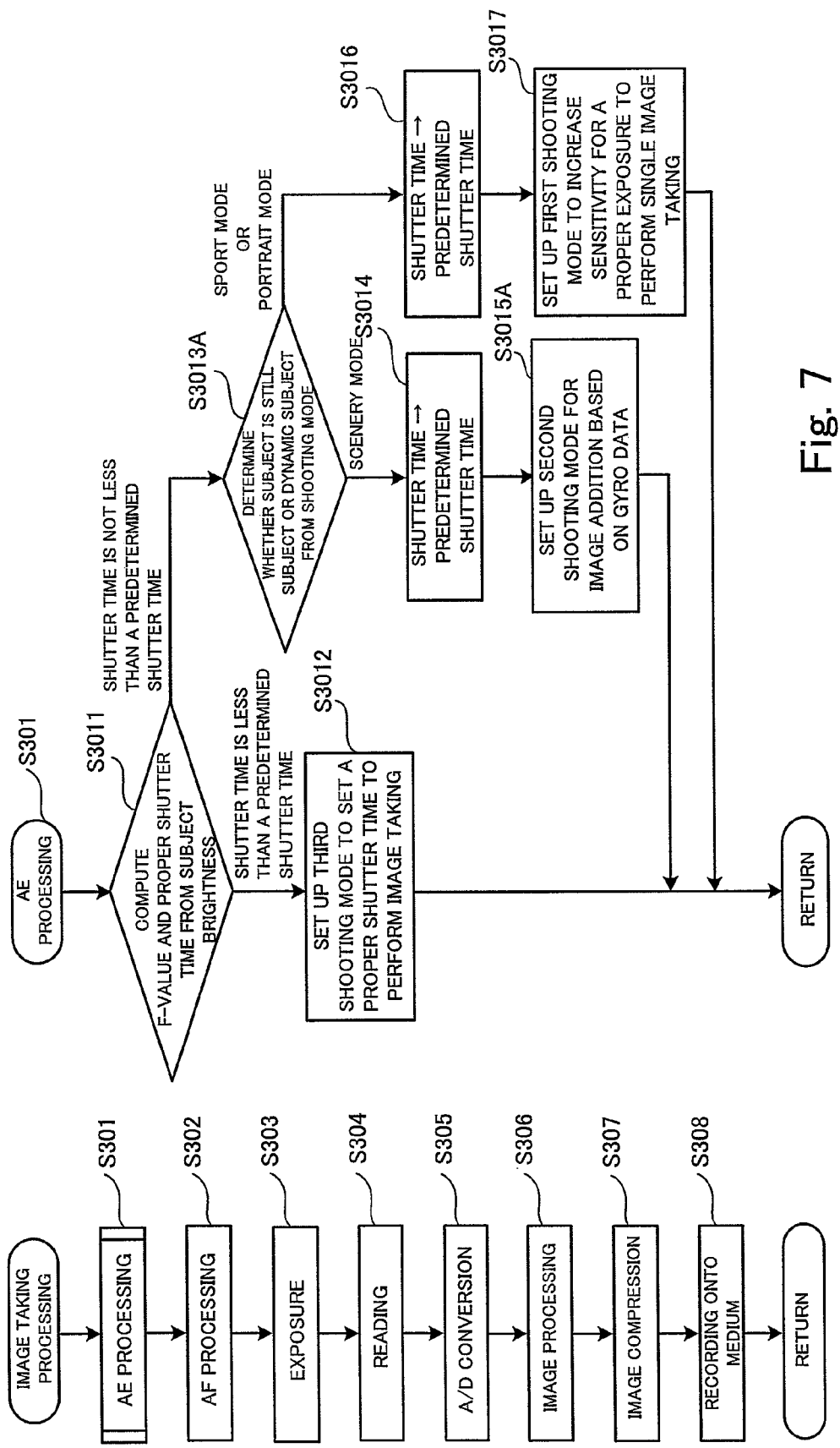
FIG. 7 is a functional block diagram useful for understanding a fourth embodiment of an image taking apparatus of the present invention.

FIG. 7 is a functional block diagram useful for understanding a fourth embodiment of an image taking apparatus of the present invention.

According to the fourth embodiment of an image taking apparatus of the present invention, it is assumed that there is used a digital camera having the external appearance of FIG. 1 and the substantially same structure as the internal structure of FIG. 5. However, according to the present embodiment, the system control section 110, which corresponds to the subject determining means referred to in the present invention, judges whether the whether the subject is a still subject or a dynamic subject in accordance with the shooting mode. Therefore, there is no need of the movement vector computing section 131 of FIG. 5.

The processing of FIG. 7 is the same as the processing of FIG. 4 excepting that the processing of the step S3015 of the part (b) of FIG. 4 is replace by the processing of a step S3015A in FIG. 7.

According to the processing of the step S3015A in FIG. 7, the image piling up section 132 performs piling up of images using the gyro-sensor 102. This structure makes it possible to correct the blurring with greater accuracy as compared with the structure wherein the blurring is corrected in accordance with the movement vector computed by the movement vector computing section 131 of FIG. 5.

It is effective that there is provided an arrangement to display on a display screen a distinction between the correction of the camera shake wherein the subject is concerned with the still subject and the images are piled up and the correction of the subject shake wherein the subject is concerned with the dynamic subject and thus a photographic sensitivity is enhanced, and the photography is performed at the shutter speed according to the photographic sensitivity. This feature makes it possible for an operator to grasp the sort of the correction of the blurring between the camera shake and the subject shake before the photography.

Figure 8:
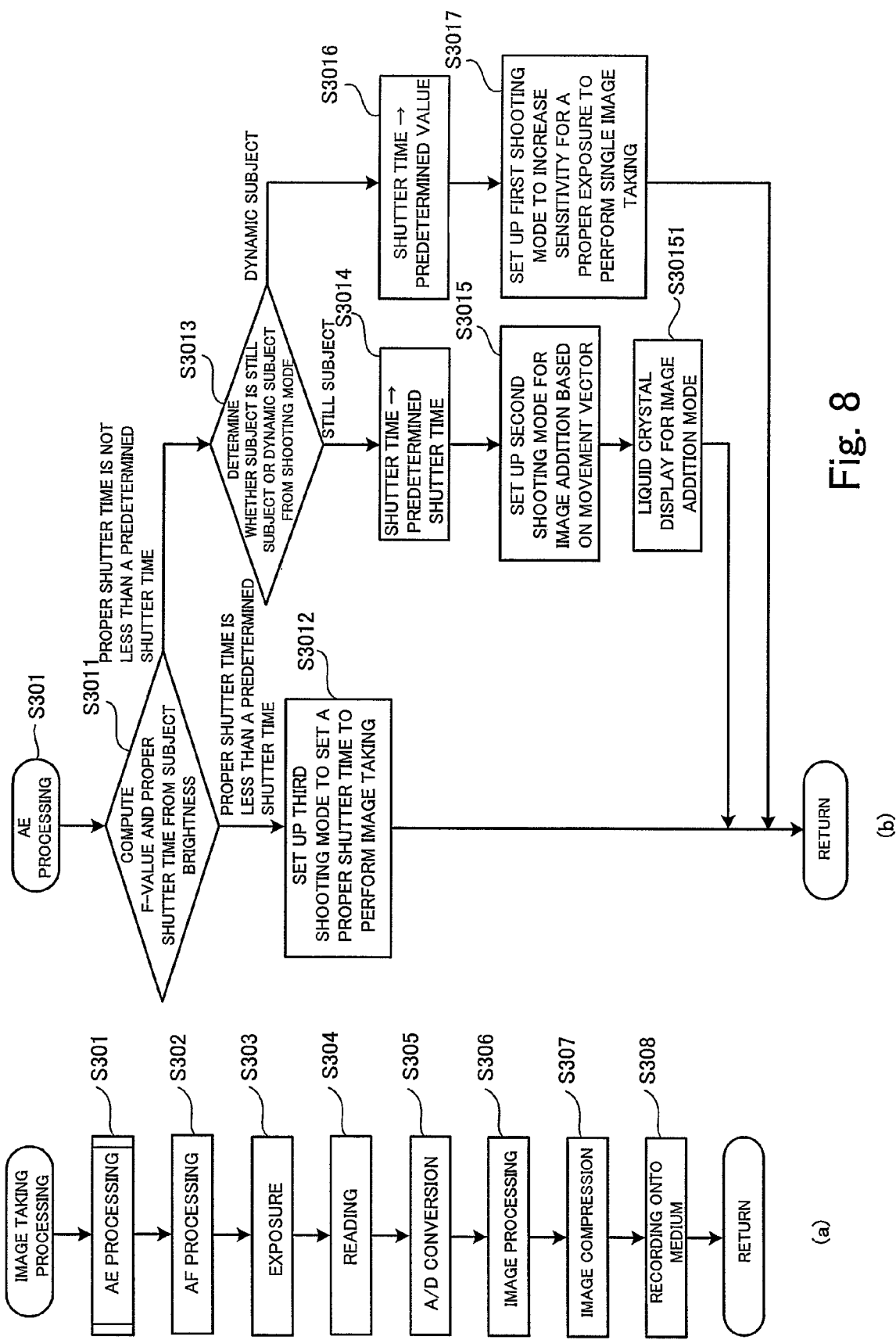
FIG. 8 is a functional block diagram useful for understanding a fifth embodiment of an image taking apparatus of the present invention.
Figure 9:
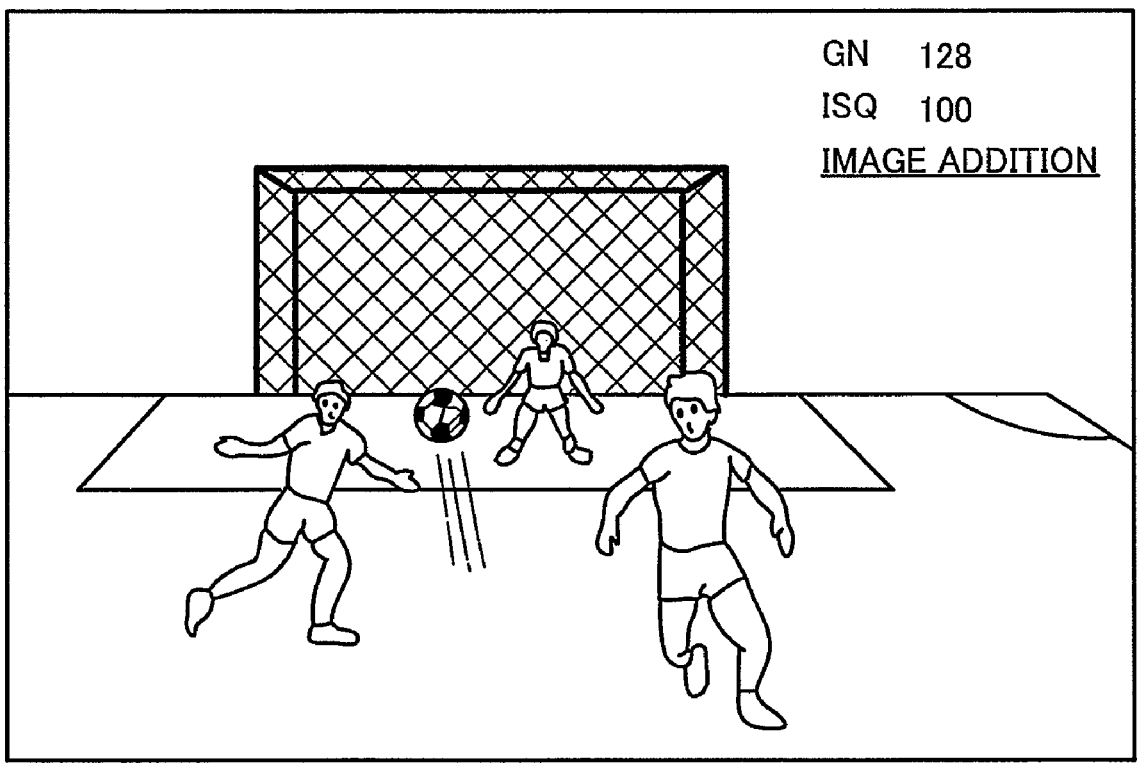
FIG. 9 is a functional block diagram useful for understanding the fifth embodiment of an image taking apparatus of the present invention.

FIG. 8 is a functional block diagram useful for understanding a fifth embodiment of an image taking apparatus of the present invention. FIG. 9 is a functional block diagram useful for understanding the fifth embodiment of an image taking apparatus of the present invention.

The processing of FIG. 8 is the same as the processing of FIG. 3 excepting that the processing of a step S30151 is added.

When there is displayed information ("image addition" in FIG. 8) indicative of the matter that the camera shake is corrected in such a way that the photography is carried out in the second shooting mode and the image piling up section 132 performs piling up of images (the processing of the step S30151), it is possible for an operator to know before the photography the decision result as to whether the digital camera 100 (cf. FIG. 1) decides that the subject is a still subject or a dynamic subject.

It is more effective that it is displayed at the time of reproducing information indicating whether taking a picture was done by either of the first shooting mode and the second shooting mode.

Figure 10:
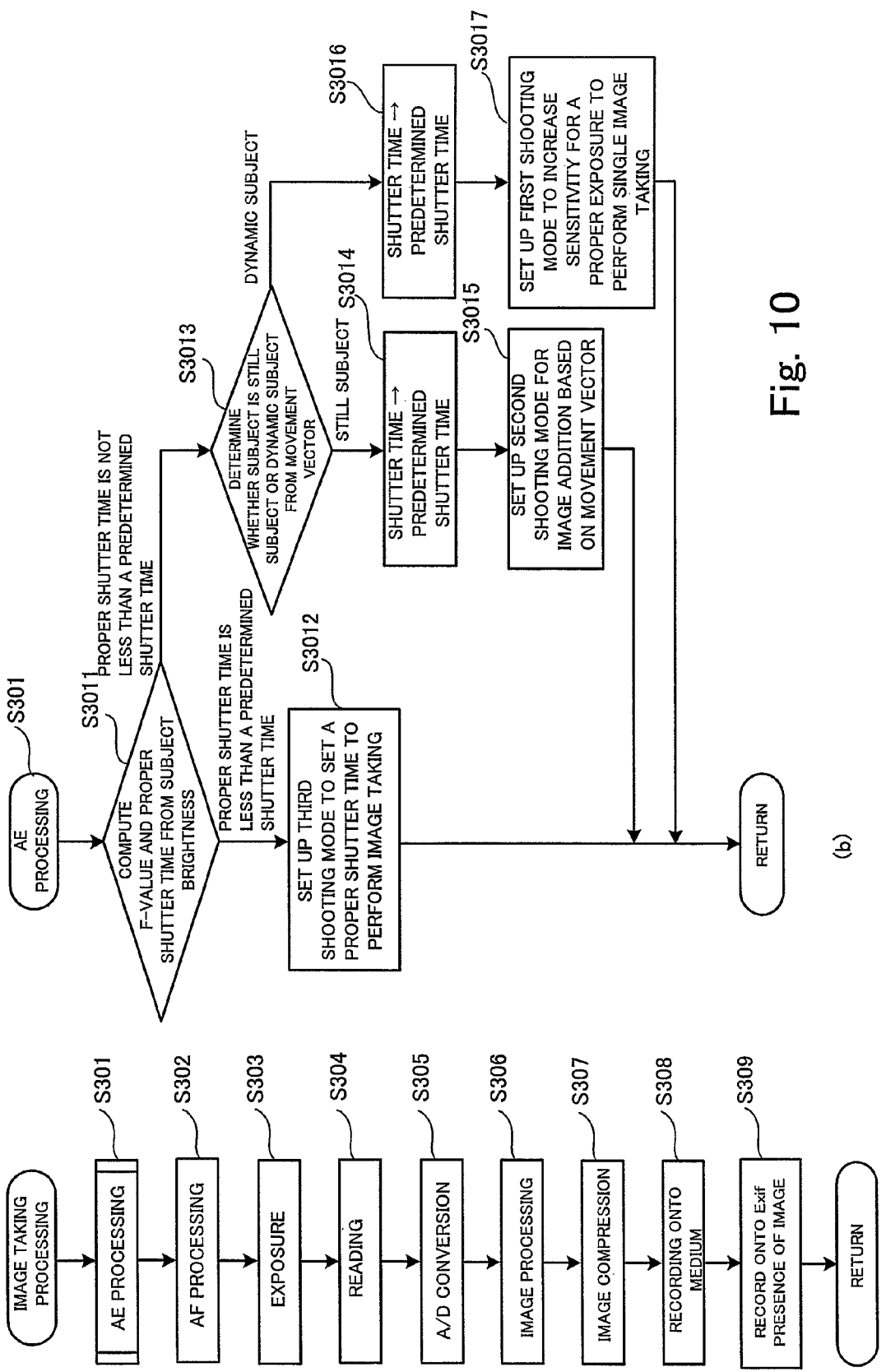
FIG. 10 is a functional block diagram useful for understanding a sixth embodiment of an image taking apparatus of the present invention.
Figure 11:
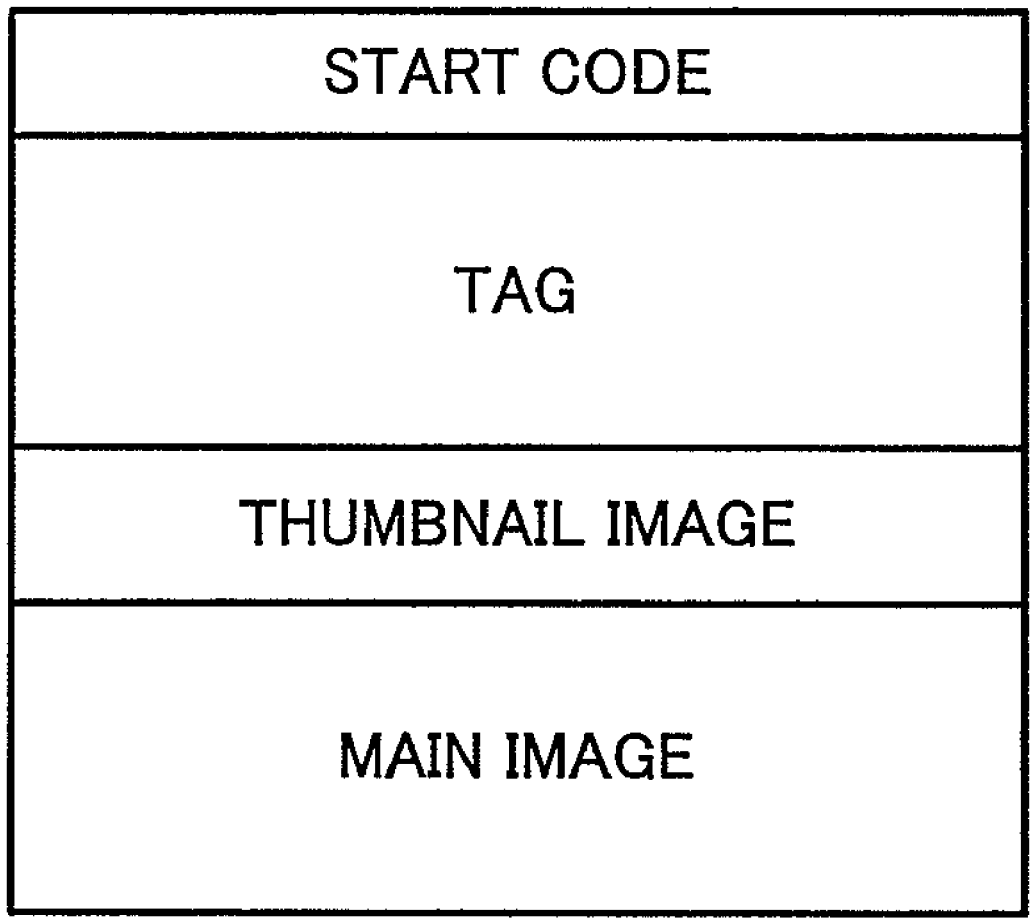
FIG. 11 is a functional block diagram useful for understanding the sixth embodiment of an image taking apparatus of the present invention.

FIG. 10 is a functional block diagram useful for understanding a sixth embodiment of an image taking apparatus of the present invention. FIG. 11 is a functional block diagram useful for understanding the sixth embodiment of an image taking apparatus of the present invention.

The processing of FIG. 10 is the same as the processing of FIG. 3 excepting that the processing of a step S309 is added. FIG. 11 is an explanatory view useful for understanding a memory allocation of Exif file.

The Exif file, which is one form of the image file, has memory areas shown in FIG. 11. The memory areas include a start code area, a tag area, a thumbnail area, and a main image area. Information on the main image, for instance, the photographic date is recorded in the tag area. The recording of information, which indicates whether the photography was done by either of the first shooting mode and the second shooting mode, onto the tag area makes it possible to read the information from the tag area at the time of reproducing and display it on the display screen 150. The photographer can analyze images on the assumption that piling up of the images is performed through seeing information on the display screen 150 (the photography according to the second shooting mode is expressed by the wording "image addition" in FIG. 10).

According to the present embodiment, there is provided the third shooting mode. It is acceptable to provide an arrangement in which the photography is carried out either of the first shooting mode and the second shooting mode without providing the third shooting mode.

According to the present embodiment, there is disclosed an example in which it is judged before the photography whether the subject is concerned with a still subject or a dynamic subject, and when it is decided that the subject is concerned with the dynamic subject, the photography is carried out in the first mode to acquire a high sensitivity image, and when it is decided that the subject is concerned with the dynamic subject, the photography is carried out in the first mode to acquire a high sensitivity of image, and when it is decided that the subject is concerned with the still subject, the photography is carried out in the second mode to acquire a piled up image with a proper exposure. It is acceptable, however, that a high frame rate of image sensor is used to determine whether the subject is a still subject or a dynamic subject at the time of the photography.

Figure 12:
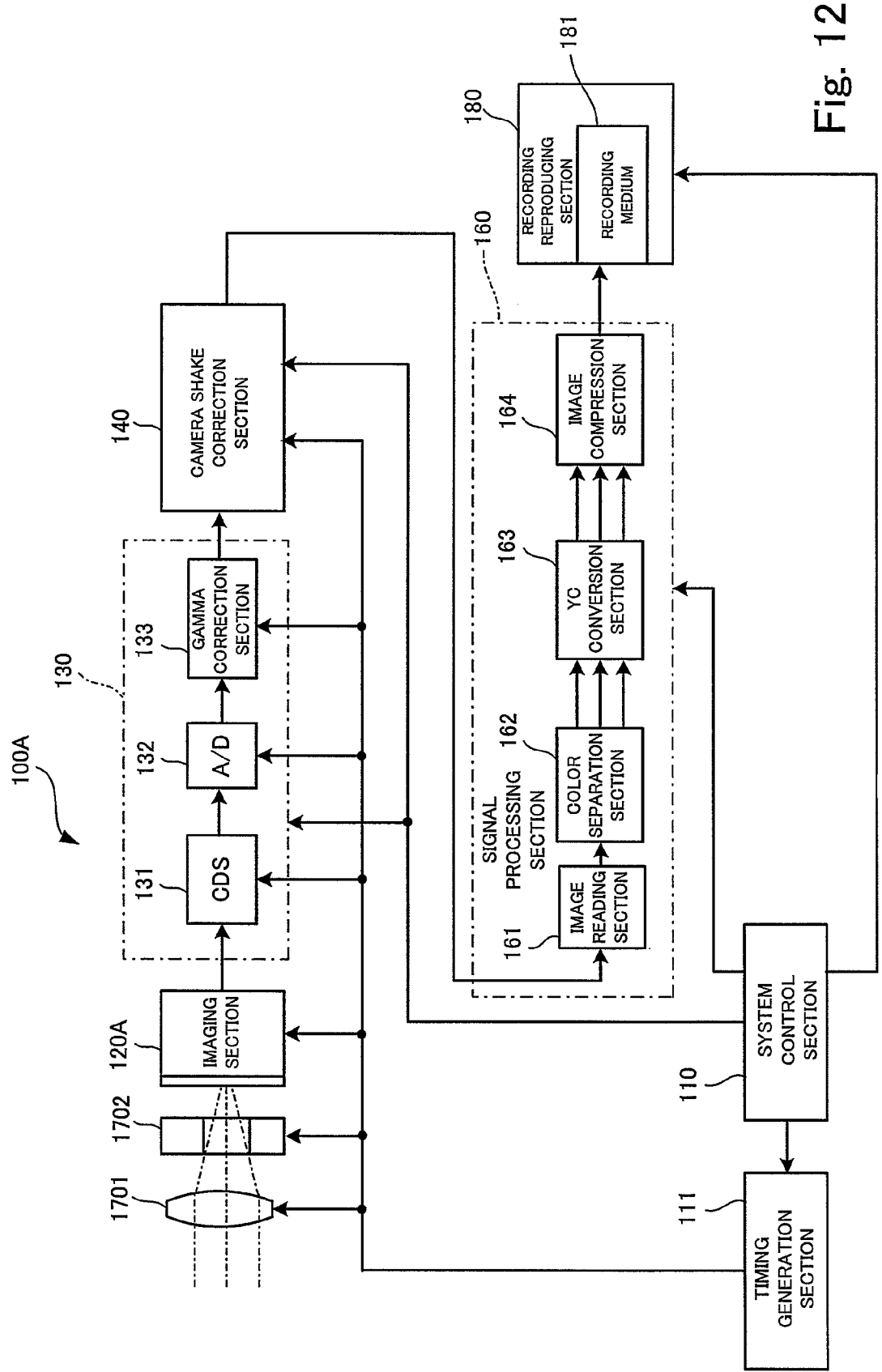
FIG. 12 is a functional block diagram useful for understanding a seventh embodiment of an image taking apparatus of the present invention.

FIG. 12 is a functional block diagram useful for understanding a seventh embodiment of an image taking apparatus of the present invention. FIG. 12 a block diagram showing an internal structure of a digital camera 100A having an imaging section 120A adopting a high frame rate of image sensor.

Hereinafter, there will be explained internal structure and operation of the digital camera 100A in conjunction with FIG. 12. It is noted that the external appearance of the digital camera 100A is the same as FIG. 1.

The digital camera 100A includes an optical lens system 1701, a timing generation section 111, a system control section 110, an aperture adjustment mechanism 1702, an imaging section 120A, a pre-processing section 130, a camera shake correction section 140, a signal processing section 160, a recording reproduction section 180, and a flash 190.

Next, there will be explained the structure of the individual elements.

The optical lens system 1701 includes a combination of two or more optical lenses (for example, a focus lens and a zoom lens). The optical lens system 1701 includes a zoom mechanism for adjusting a position of a zoom lens of the optical lens system to adjust a focal length and an AF (Automatic Focus) adjustment mechanism for adjusting a position of a focus lens of the optical lens system to adjust a focus. To activate those mechanisms, driving signals, which are generated in the timing generation section 111, are supplied to those mechanisms.

The timing generation section 111 incorporates therein an oscillator for generating a system clock for the digital camera 100A. The timing generation section 111 further has a timing signal generating section for generating a timing signal synchronized with the system clock and a driving signal generating section for generating a driving signal synchronized with the system clock. Upon receipt of the control signal from the system control section 110, the timing generation section 111 outputs the timing signal to the imaging section 120A, the pre-processing section 130, and the driving signal generating section of the timing generation section 111. Upon receipt of the timing signal, the driving signal generating section of the timing generation section 111 outputs the driving signal to the above-mentioned mechanisms.

The system control section 110, which supplies the control signal to the timing generation section 111, has CPU (Central Processing Unit) and ROM into which operating procedure for the digital camera 100 is written. The system control section 110 generates the control signal to control the operation of the individual sections using information supplied from the handler group 101 (including the release button) in accordance with the user's operation and information of the ROM, so that the generated control signal is supplied to the timing generation section 111, the pre-processing section 130, the camera shake correction section 140, the signal processing section 160, and the recording reproduction section 180.

The aperture adjustment mechanism 1702, which is disposed after the optical lens system 1701, serves as a mechanism for adjusting the incidence luminous flux sectional area (that is, the area of an aperture stop) so that the luminous flux of the optimal incidence light can be supplied to the image sensor in taking a picture of the subject. Supplied to the aperture adjustment mechanism 1702 is the driving signal from the timing generation section 111. The driving signal is generated based on stop and exposure time which is computed by the system control section 110 through performing AE (Automatic Exposure) processing based on the signal electrical charge subjected to the photoelectric conversion by the imaging section 120. The system control section 110 supplies to the timing generation section 111 the control signal according to the stop and exposure time so as to cause the driving signal generating section of the timing generation section 111 to generate the driving signal.

The imaging section 120A has image sensors for performing a photoelectric conversion wherein the image sensors are disposed in such a way that the image sensors are perpendicular to the optical axis of the optical lens system. At the incident side of the image sensors, there are arranged on a two-dimensional basis color filters for performing color separation corresponding to individual photoelectric conversion devices in a unitary body. The image sensors perform the photoelectric conversion in accordance with the timing signal generated from the timing generation section 111. The signal electrical charge, which is obtained by the photoelectric conversion, is supplied to the pre-processing section 130 in a predetermined timing, for instance, a timing of off of the electronic shutter. According to the present embodiment, the image sensors start the photography for a through picture through reducing the number of pixels when the digital camera 100A is set to the shooting mode, and performs the photography for a proper image to be recorded interrupting the photography for a through picture when the release button is depressed on a full-depression basis in the shooting mode. While details will be described later, the image sensors of FIG. 12 are ones having a high speed frame rate. When a camera shake correction is carried out, a high speed multi-page is performed by one taking a picture operation when the release button is pushed on a full-depression basis, so that the photography for the proper image is performed while a camera shake correction section 140. Thus, in the following explanation, regarding the explanation that a high speed multi-page is performed by one taking a picture operation, an image, which is obtained through performing the high speed multi-page, is referred to as a multi-page image, and the multi-page image is referred to as the multi-page image of the first time and the multi-page image of the second times in accordance with the number of times for the multi-page, or the multi-page frequency. In the event that the high speed multi-page is carried out so as to electronically perform the correction of the blurring, the multi-page of the multi-page frequency according to the shutter speed is carried out so that the blurring is electronically corrected to obtain the proper image.

The pre-processing section 130 includes CDS (Corrected Double Sampling) 131, A/D 132, and a gamma correction section 133. The CDS 131 includes a clamp circuit and a sample hold circuit. For instance, when the CCD solid state image sensor is used for the image sensor, the use of the clamp circuit and the sample hold circuit makes it possible to remove various types of noises, which will be generated by the operation of the CCD solid state image sensor, in accordance with the timing signal generated by the timing generation section 111. The CDS 131 further includes an amplifier circuit for amplifying an input signal with a gain according to the control signal generated by the system control section 110. The signal electrical charge outputted from the sample hold circuit, which is removed in the above-mentioned various types of noises, is supplied to the amplifier circuit in the form of exact color signals (R,G,B) representative of light quantity of light receiving. The amplifier circuit amplifies the input color signal with a predetermined gain. The A/D 132 quantizes the amplified color signal with a predetermined quantizing level so as to be converted into a digital signal. When the system control section 110 supplies the control signal representative of the high gain to enhance the photographic sensitivity, the A/D 132 receives a signal which is amplified with a gain grater than the predetermined gain, so that the A/D 132 quantizes the amplified signal with a predetermined quantizing level so as to be converted into a digital signal. At that time, the conversion into the digital signal is performed in accordance with the timing signal generated from the timing generation section 111.

The gamma correction section 133 has a look-up table for gamma correction. The look-up table outputs a digital signal which is subjected to the gamma correction in accordance with a digital signal fed to the look-up table, so that individual color signals, which are converted into the digital signals, are supplied to the camera shake correction section 140. In this case, when it is concerned with the through image, the signals representative of the through image, which are output from the gamma correction section 133, are supplied to the signal processing section 160 making a detour to avoid the camera shake correction section 140.

First of all, when it is concerned with the through image, the image signal representative of the through image is supplied to the signal processing section 160 making a detour to avoid the camera shake correction section 140. The signal processing section 160 applies color separation and YC conversion processing to the image signal representative of the through image, and the image signal, which is subjected to the color separation and the YC conversion processing, is supplied to an image display section (not illustrated) to display the through image on the LCD 150 (refer to FIG. 1). When the release button 102 is operated while the though image is displayed, the system control section 110 causes the imaging section 120A having a high frame rate to start a high speed multi-page in such a manner that the system control section 110 instructs the timing generation section 111 to successively supply the timing signals for the number of sheets of taking a picture based on the shutter speed acquired by the AE processing. The imaging section 120A successively output the multi-page image to the pre-processing section 130 to perform the conversion processing into the digital signals on each multi-page image every time. Thus, the pre-processing section 130 successively supplies the multi-page images to the camera shake correction section 140. In this case, the multi-page image of the first time is memorized in a frame memory (not illustrated) of the imaging section 120A. After all the multi-page images are outputted to the pre-processing section 130, the images are outputted from the frame memory of the imaging section 120A to the pre-processing section 130 so that the amplifier circuit of the pre-processing section 130 amplifies the signal with high gain to generate a high sensitivity of image. The thus generated high sensitivity of image is stored in a frame memory (not illustrated) located at the last stage of the pre-processing section 130.

Here, there will be explained the structure in conjunction with FIG. 13 as well as FIG. 12.

Figure 13:
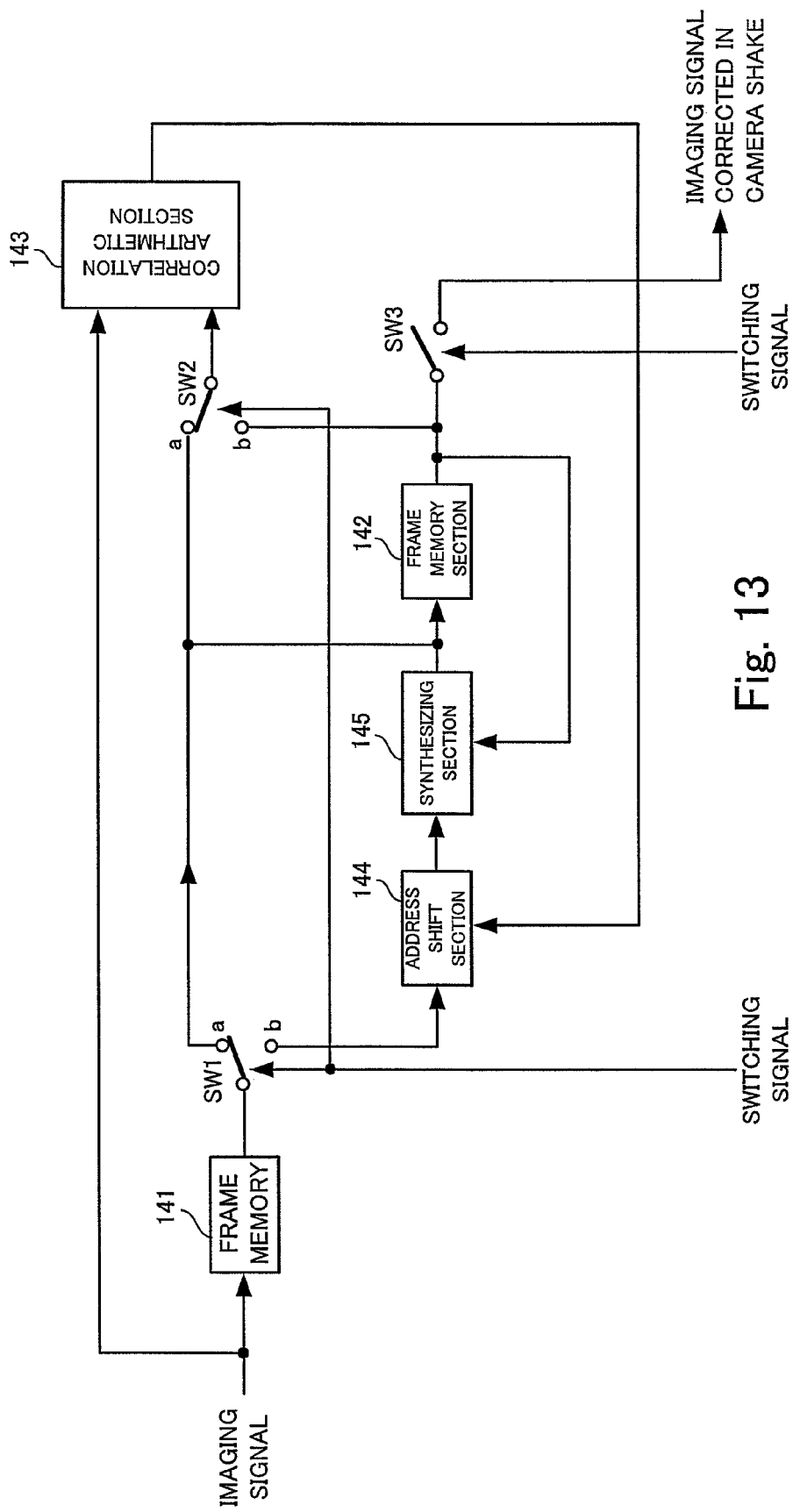
FIG. 13 is a functional block diagram useful for understanding the seventh embodiment of an image taking apparatus of the present invention.

FIG. 13 is a functional block diagram useful for understanding the structure of the camera shake correction section 140 shown in FIG. 12.

The camera shake correction section 140 shown in FIG. 13 includes a frame memory 141, a frame memory section 142, a correlation arithmetic section 143, an address shift section 144, a synthesizing section 145, and three switches SW1, SW2 and SW3. According to the present embodiment, the frame memory 141 and the frame memory section 142 each use a non-destructive readout memory having a storage capacity capable of storing a frame of color signals for each R, G and B.

When the camera shake correction section 140 receives the multi-page images which are formed at high speed in accordance with an operation of the released button while the through image is displayed, the camera shake correction section 140 judges, using the multi-page images sequentially supplied thereto, whether the subject is concerned with the dynamic subject or the still subject.

When the multi-page of the first time and the multi-page of the second time, of the multi-pages of two or more times done by once operating of the release button 102, are executed, the correlation arithmetic section 143 receives the multi-page image of the first time and the multi-page image of the second time. At that time, the switches SW1 and SW2 are both switched to "a" side, so that the multi-page image of the first time, which is stored in the frame memory 141, is supplied to the correlation arithmetic section 143 via the switches SW1 and SW2 and also to the frame memory section 142.

When the correlation arithmetic section 143 receives both the multi-page image of the first time and the multi-page image of the first time, the correlation arithmetic section 143 uses those two images to detect movement vector representative of the camera shake for each area of the subject. After the correlation arithmetic section 143 detects movement vector, the switches SW1 and SW2 are both switched to "b" side under the control of the system control section 110, and positional data (for example, coordinates data x, y) indicative of the detected movement vector is supplied to the address shift section 144. At that time, the content of the frame memory 141, that is, the multi-page image of the first time is rewritten by the multi-page image of the second time, and the multi-page image of the second time, that is, the content of the frame memory 141 is supplied via the contact "b" of the switch SW1 to the address shift section 144.

The frame memory section 142 stores multi-page image of the first time. Thus, the blurring is corrected in such a manner that the address shift section 144 offsets the position of the multi-page image of the second time to meet the position of the multi-page image of the first time of the frame memory section 142 so that the multi-page image of the second time is added based on the multi-page image of the first time. Thus, the frame memory section 142 stores therein the piled up image corrected in blurring.

Hereinafter, the multi-page image of the third time, the multi-page image of the fourth time, . . . are sequentially supplied to the correlation arithmetic section 143 based on the position of the multi-page image of the first time in the frame memory section 142, and the movement vector is detected from both the images. Thus, the blurring is corrected based on the detected movement vector, and the piled up images obtained through the addition are sequentially overwritten into the frame memory section 142.

Thus, when the multi-page images reach a predetermined number of sheets through the sequential addition of the photographic images obtained by the multi-page of two or more sheets by one taking a picture operation, the switch SW3 is switched from turn-off to turn-on in accordance with a switching signal from the system control section 110.

According to the present embodiment, the arithmetic operation result of the correlation arithmetic section 143 is transmitted on a real time basis to the system control section 110 as well as the address shift section 144. The system control section 110 judges whether the subjects of two or more sheets of images obtained through the photography are concerned with the still subject or the dynamic subject over two or more sheets of images. Upon receipt of the arithmetic operation result of the correlation arithmetic section 143, when the system control section 110 decides that the subject is concerned with the dynamic subject, the system control section 110 notifies the signal processing section 160 the effect that the high sensitivity image of the pre-processing section 130 is to be read. When the system control section 110 decides that the subject is concerned with the still subject, the system control section 110 notifies the signal processing section 160 the effect that the piled up image of the frame memory section 142 of the camera shake correction section 140 is to be read.

When the signal processing section 160 receives from the system control section 110 the notification that the subject is concerned with the dynamic subject, the signal processing section 160 reads the high sensitivity image stored in a frame memory (not illustrated) of the pre-processing section 130. When the signal processing section 160 receives from the system control section 110 the notification that the subject is concerned with the still subject, the signal processing section 160 reads the piled up image stored in the frame memory section 142 of the camera shake correction section 140.

When the signal processing section 160 shown in FIG. 12 reads the high sensitivity image or the piled up image, a color separation section 162 of the signal processing section 160 selectively divides up individual color signals constituting an image, and generates on an interpolation basis a color signal of a certain pixel by color signals by color signals of surrounding pixels of the pixel, so that the individual color signal is generated in form of a plane signal every an image. Thus generated plane signal is supplied to a YC converter section 163.

The YC converter section 163 generates YCC signals in accordance with a conversion matrix. The YCC signals are supplied to an image compression section 164. The image compression section 164 compresses the YCC signals. The recording reproduction section 180 records onto a recording medium 181 an image file which includes the compressed YCC signals and compression information.

According to the arrangement as mentioned above, there are created the high sensitivity image and the piled up image of the low sensitivity through one photographic operation, and when it is decided by the system control section 110 and the correlation arithmetic section 143 that the subject is concerned with the dynamic subject, the high sensitivity image is recorded on the recording medium 181, and when it is decided that the subject is concerned with the still subject, the piled up image is recorded on the recording medium 181.

Here, there will be explained a procedure of the above-mentioned image taking processing to be executed by the system control section 110 and the signal processing section 160 in conjunction with FIG. 14.

Figure 14:
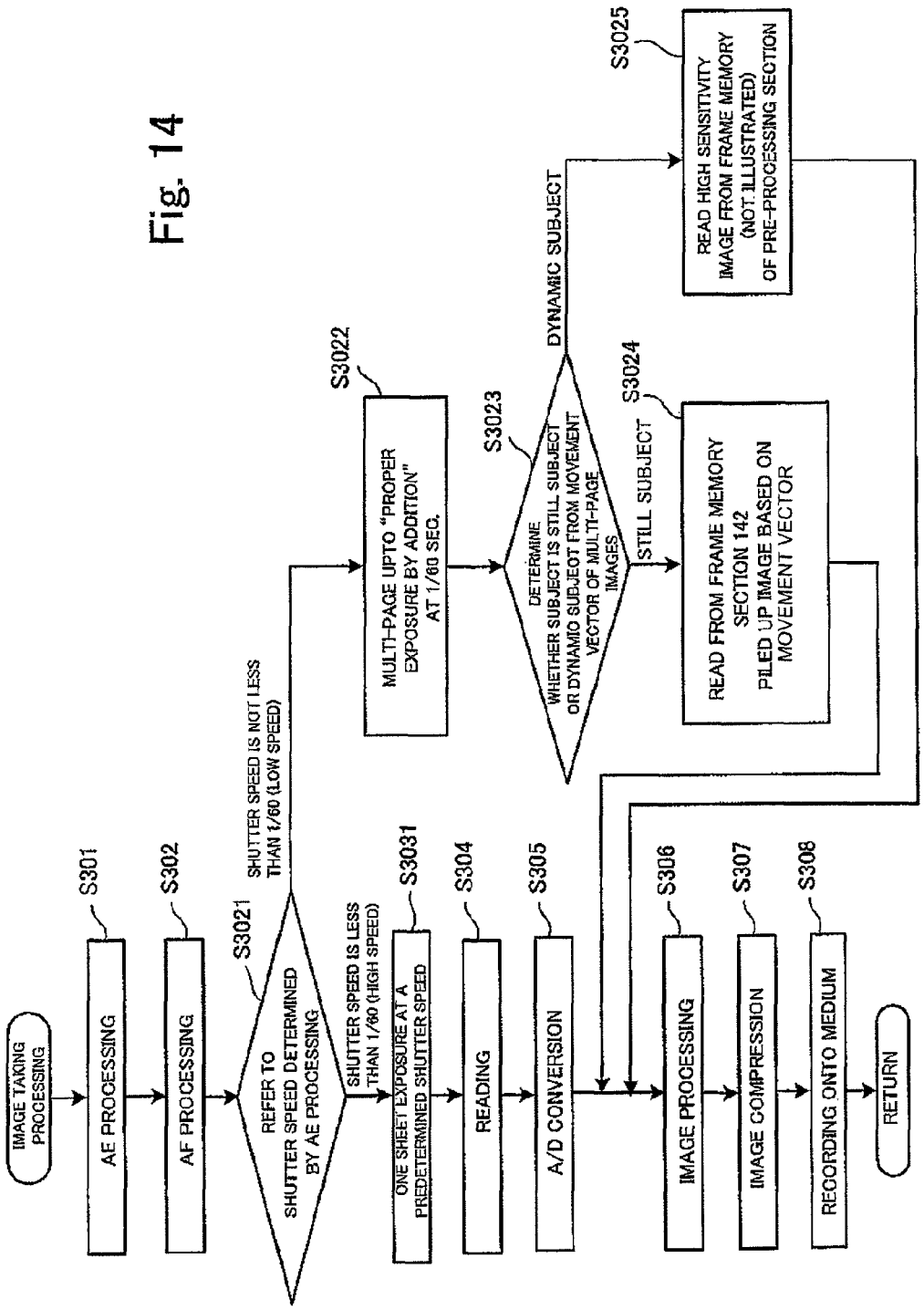
FIG. 14 is a functional block diagram useful for understanding the seventh embodiment of an image taking apparatus of the present invention.

FIG. 14 is a functional block diagram useful for understanding the seventh embodiment of an image taking apparatus of the present invention. FIG. 14 is a flowchart useful for understanding a procedure of the image taking processing to be executed by the system control section 110 and the signal processing section 160. When the mode selection lever 101e of the handler group 101 is switched to the shooting mode side and then the release button 102 is depressed on a half-depression basis, the system control section 110 executes the processing of the flowchart of FIG. 14.

In FIG. 14, the same parts are denoted by the same reference numbers as those of FIG. 3.

In the step S301, the system control section 110 executes the AE processing to compute the aperture value and the shutter speed. In the step S302, the system control section 110 executes the AF processing to locate the focus lens at the focus position. In a step S3021, when the release button 101f is pushed on a full-depression basis, the system control section 110 judges whether the shutter speed is less than 1/6 seconds or not less than 1/6 seconds referring to the shutter speed computed in the step S301.

When it is decided that the shutter speed is less than 1/6 seconds, the process goes to a step S3031 in which an exposure for a sheet of image is carried out at a predetermined shutter speed. In the step S304, the timing signal is supplied from the timing generation section 111 to imaging section 120 to read an image that is output to the pre-processing section 130. In the step S305, the A/D 132 of the pre-processing section 130 performs the conversion into the digital signal. In the step S306, the signal processing section 160 reads the high sensitivity image stored in the frame memory (not illustrated) of the pre-processing section 130 to perform color separation and YC conversion processing and the like. When the system control section 110 detects rewriting of flag in the signal processing section 160, the system control section 110 records the image file onto the recording medium in corporation with the recording reproduction section 180 and terminates the processing of this flowchart.

In step S3021, when it is decided that shutter speed is not less than 1/6 seconds, the process goes to a step S3022 in which it is decided that a proper exposure can be established when how many images are piled up at the shutter speed of 1/60 seconds, and the number of sheets for photography is set to the timing generation section 111, and the imaging section 120 starts the high speed multi-page operation. In a step S3023, it is judged from the multi-page images in accordance with the operation result of the correlation arithmetic section 143 of the camera shake correction section 140 whether the subject is concerned with the still subject or the dynamic subject. In the step S3023, when it is decided that the subject is concerned with the still subject, it notifies the signal processing section 160 so. In a step S3024, the signal processing section 160 reads the piled up images from the frame memory section 142 of the camera shake correction section 140. In the step S3023, when it is decided that the subject is concerned with the dynamic subject, it notifies the signal processing section 160 so. In a step S3025, the signal processing section 160 reads the high sensitivity images from the frame memory (not illustrated) of the pre-processing section 130. Hereafter, processing from the step S306 to the step S308 is carried out. As a result, when the subject is concerned with the dynamic subject, the high sensitivity image is recorded, and when the subject is concerned with the still subject, the piled up image is recorded. Thus, the processing is terminated.

In this manner, it is acceptable that a high frame rate of image sensor is used to perform a high speed multi-page at the time of photography, and it is discriminated whether the subject is concerned with the still subject or the dynamic subject.

By the way, an enhancement of a gain of the amplifier circuit for raising the photographic sensitivity may bring about noisy images. Thus, in a case where a migration length of the subject is a little, it happens that it is better to perform the piling up of images.

Figure 15:
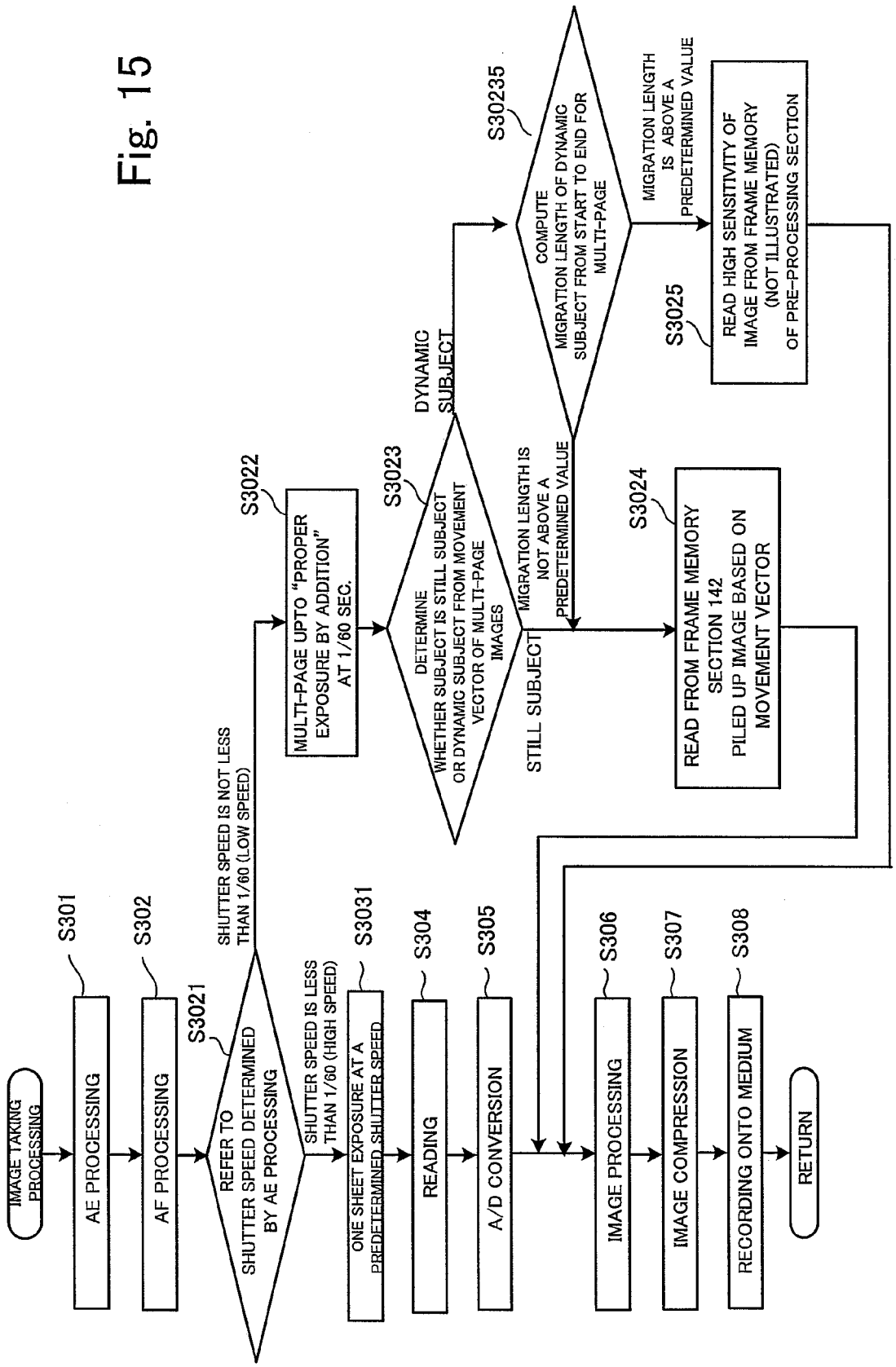
FIG. 15 is a functional block diagram useful for understanding an eighth seventh embodiment of an image taking apparatus of the present invention.

FIG. 15 is a functional block diagram useful for understanding an eighth seventh embodiment of an image taking apparatus of the present invention. FIG. 15 shows an example in which a migration length of the subject is detected, and as a result, when the migration length of the subject is less than a predetermined value, it is decided that the subject is concerned with the static subject, so that the piled up image corrected in the camera shake can be obtained, and when the migration length of the subject exceeds a predetermined value, it is decided that the subject is concerned with the dynamic subject, so that the high sensitivity image suppressed in the subject shake can be obtained.

FIG. 15 is the same as FIG. 14 excepting that a step S30235 is added.

In the step S30235, the system control section 110, which constitutes an example of the subject discriminating means referred to in the present invention, judges in accordance with the movement vector computed by the correlation arithmetic section 143, which constitutes an example of the movement vector computing means referred to in the present invention, as to whether the subject moves by a predetermined migration length or less during photography for two or more sheets of images, or exceeding the predetermined migration length. And when it is decided that the subject moves by a predetermined migration length or less, and exceeding the predetermined migration length, it is judged that the subject is concerned with the static subject and the dynamic subject, respectively.

It is acceptable to provide an arrangement as mentioned above.

Further, it is acceptable to provide such an arrangement that face detecting means is provided, and when the face detecting means detects a face, the subject is regarded as the dynamic subject, and when the face detecting means detects no face, the subject is regarded as the still subject, wherein when the face detecting means detects a face, the subject is regarded as the dynamic subject, and it is judged whether the subject moves by a predetermined migration length or less while photography for two or more sheets of images, or exceeding the predetermined migration length.

Figure 16:
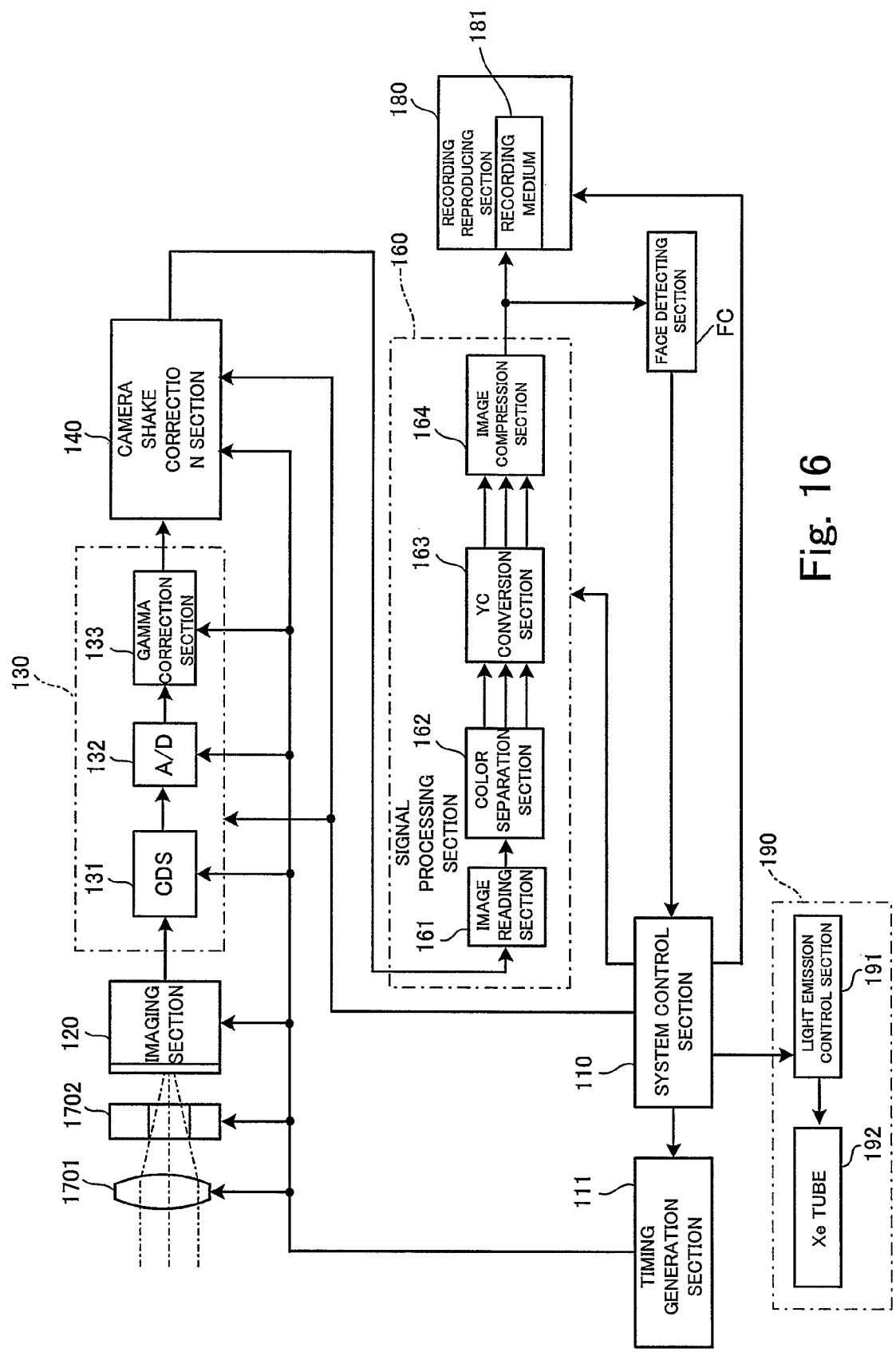
FIG. 16 is a functional block diagram useful for understanding a ninth embodiment of an image taking apparatus of the present invention.
Figure 17:
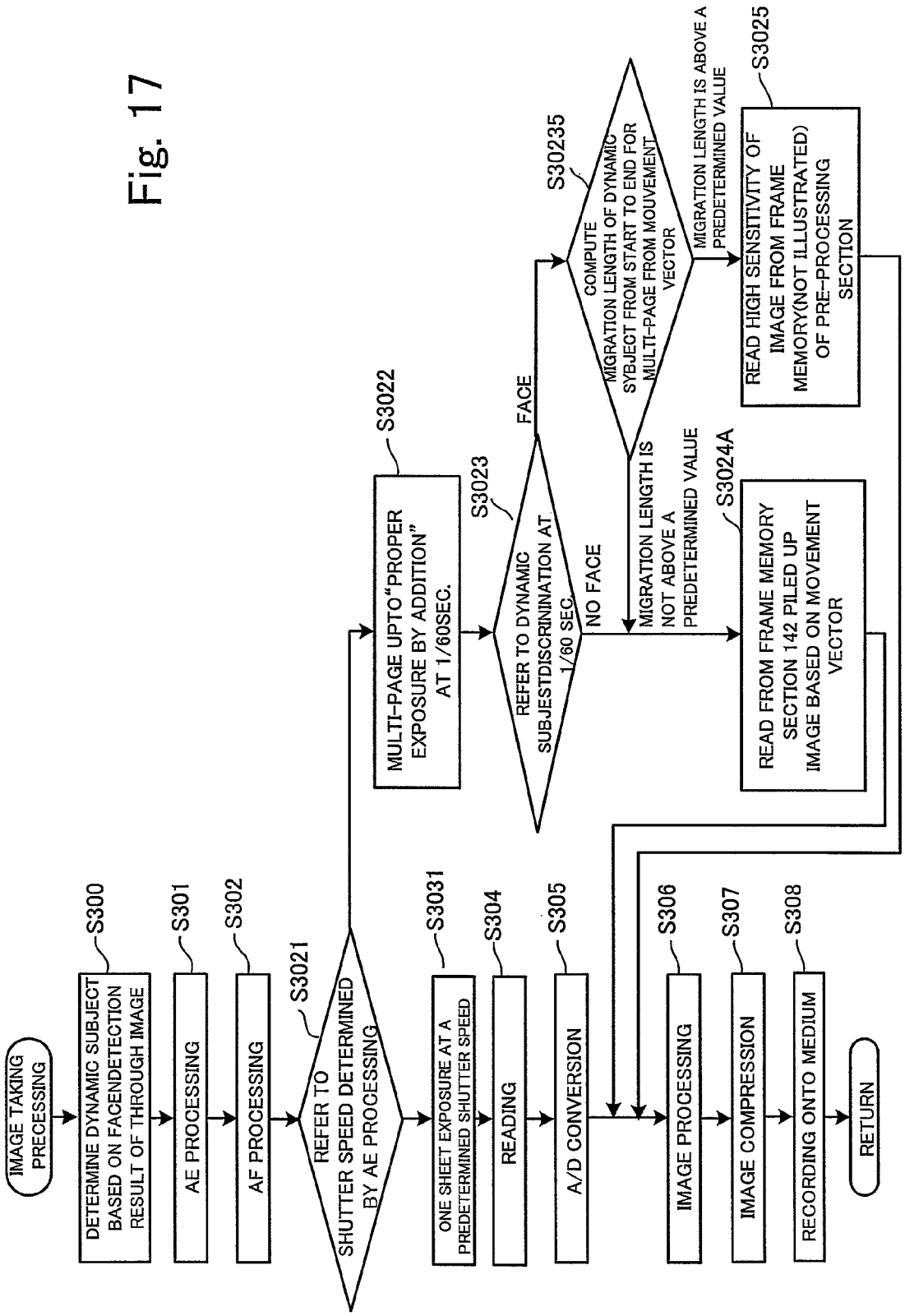
FIG. 17 is a functional block diagram useful for understanding the ninth embodiment of an image taking apparatus of the present invention.

FIG. 16 is a functional block diagram useful for understanding a ninth embodiment of an image taking apparatus of the present invention. FIG. 17 is a functional block diagram useful for understanding the ninth embodiment of an image taking apparatus of the present invention.

A structure of FIG. 16 is the same as that of FIG. 12 excepting that face detecting means FC is added. Processing of the flowchart of FIG. 17 is the same as that of FIG. 15 excepting that processing of a step S300 is added, and the processing of the step S3023 is altered.

According to the present embodiment, the system control section 110 causes the face detecting means FC to detect whether a face exists in the through image immediately before the photography (the step S300), and upon receipt of a message of the effect that the face is detected, the system control section 110 detects the migration length in accordance with the movement vector (the step S30235).

Figure 18:
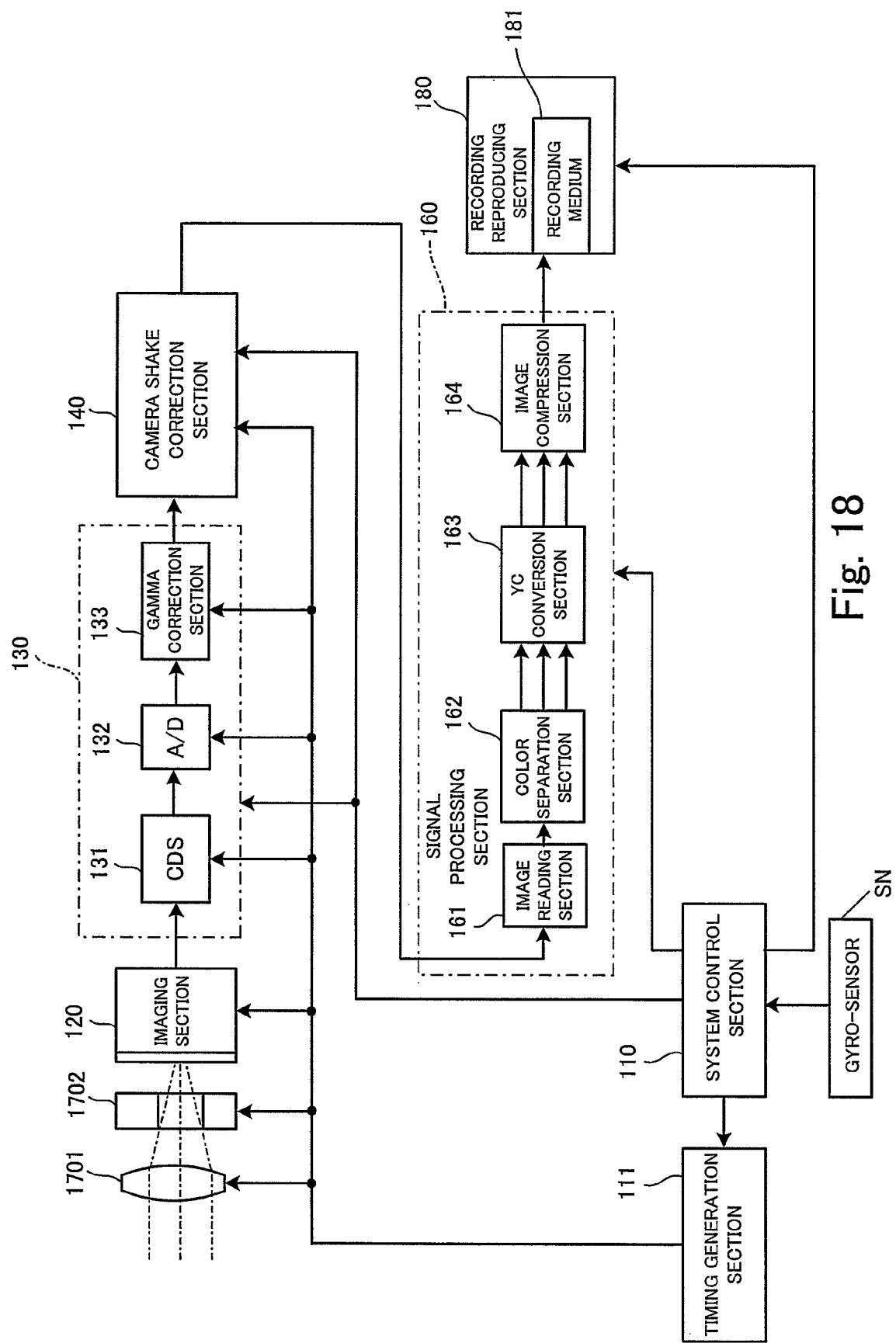
FIG. 18 is a functional block diagram useful for understanding a tenth embodiment of an image taking apparatus of the present invention.
Figure 19:
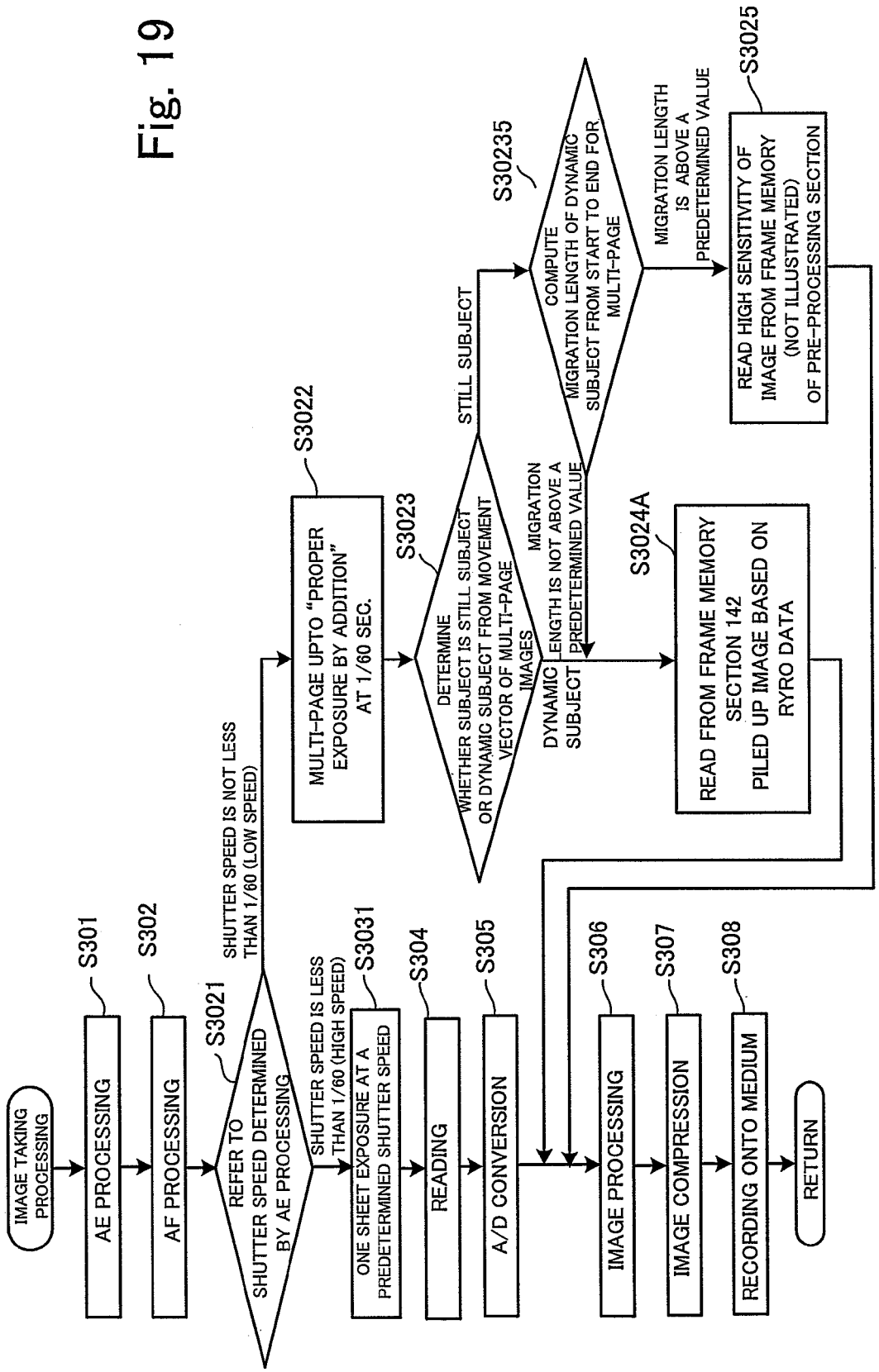
FIG. 19 is a functional block diagram useful for understanding the tenth embodiment of an image taking apparatus of the present invention.

FIG. 18 is a functional block diagram useful for understanding a tenth embodiment of an image taking apparatus of the present invention. FIG. 19 is a functional block diagram useful for understanding the tenth embodiment of an image taking apparatus of the present invention.

A structure of FIG. 18 is the same as that of FIG. 12 excepting that a gyro-sensor SN is added. Processing of the flowchart of FIG. 19 is the same as that of FIG. 15 excepting that processing of the step S3024 is replaced by the processing of the step S3023A, and the piling up is carried out in accordance with the angular velocity detected by the gyro-sensor SN instead of the movement vector.

Figure 20:
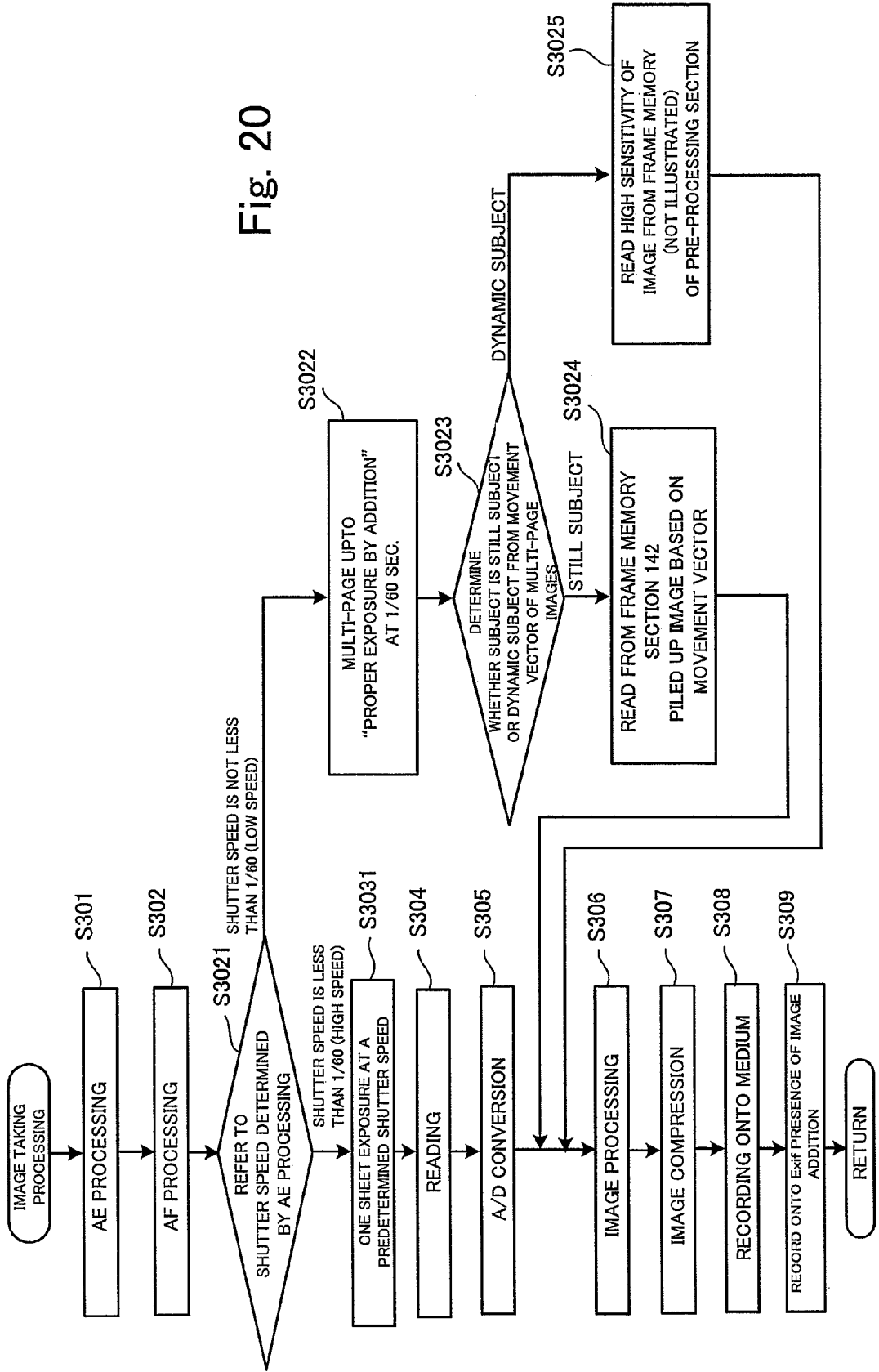
FIG. 20 is a functional block diagram useful for understanding an eleventh embodiment of an image taking apparatus of the present invention.
Figure 21:
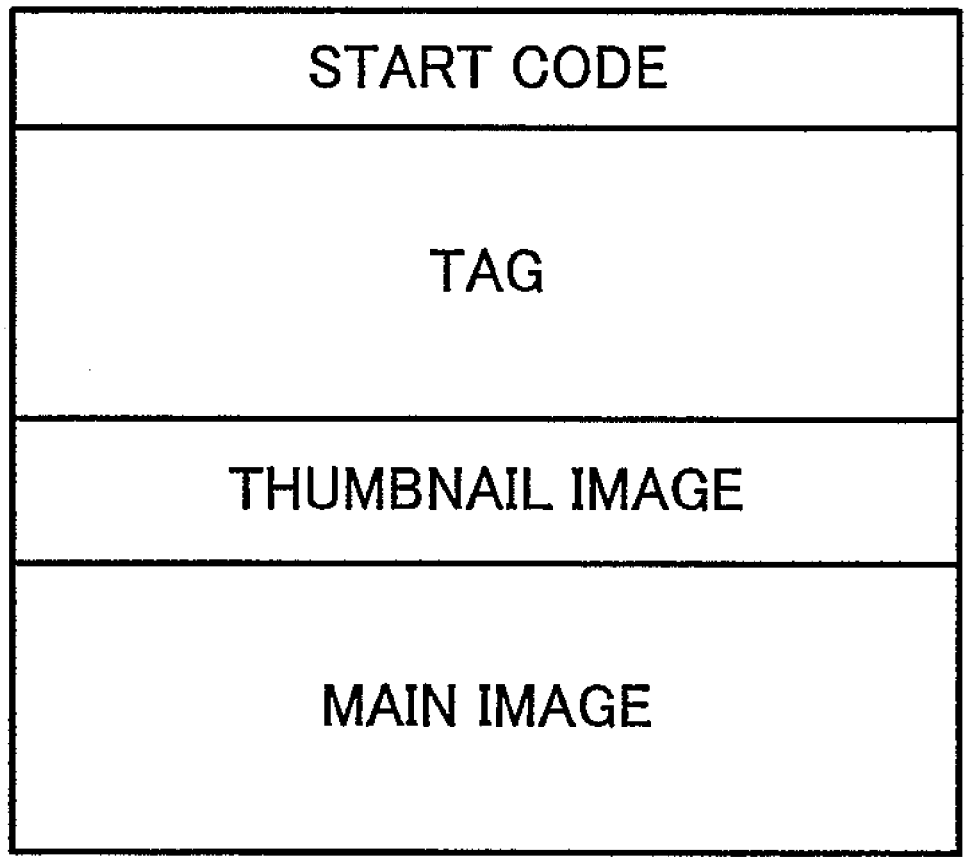
FIG. 21 is a functional block diagram useful for understanding the eleventh embodiment of an image taking apparatus of the present invention.

FIG. 20 is a functional block diagram useful for understanding an eleventh embodiment of an image taking apparatus of the present invention. FIG. 21 is a functional block diagram useful for understanding the eleventh embodiment of an image taking apparatus of the present invention.

The flowchart of FIG. 20 is the same as that of FIG. 12 excepting that a step S309 is added. FIG. 21 is an explanatory view useful for understanding a memory allocation of Exif file that is one form of the image file. The Exif file has memory areas shown in FIG. 21. The memory areas include a start code area, a tag area, a thumbnail area, and a main image area. Information on the main image, for instance, the photographic date is recorded in the tag area. The recording of information, which indicates which one of the high sensitivity image and the piled up image is recorded onto the tag area, makes it possible to read the information from the tag area at the time of reproducing and display it on the display screen 150. The photographer can distinguish the high sensitivity image and the piled up image from one another through seeing information on the display screen 150.

As mentioned above, according to the present invention, it is possible to implement an image taking apparatus capable of suitably correcting the subject shake and the camera shake in the still picture photography.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image taking apparatus that images a subject on an imaging device to create an image representative of the subject, the image taking apparatus comprising:

through image creating means that repeatedly creates images before photography;

movement vector computing means that computes a movement vector for each of areas which are obtained by dividing each one of the images repeatedly created by the through image creating means into two or more areas, between the images;

subject determining means that determines whether the subject is a still subject or a dynamic subject in accordance with the movement vectors computed by the movement vector computing means;

image taking means in which when the subject determined by the subject determining means is a dynamic subject, a photography is performed in accordance with a first shooting mode to create a single photographic image through increasing a photography sensitivity, and when the subject determined by the subject determining means is a still subject, a photography is performed in accordance with a second shooting mode to create a series of two or more photographic images;

image piling up means that, when the subject determined by the subject determining means is a still subject, creates a piled up image by adjusting each position of the two or more images obtained through performing the second shooting mode so that relative blurring is corrected between the two or more images, and then piling up the two or more images;

subject brightness detection means that detects a brightness of the subject; and proper shutter time computing means that computes a proper shutter time to perform a photography with a proper exposure in accordance with the brightness of the subject detected by the subject brightness detection means, wherein when the proper shutter time computed by the proper shutter time computing means is shorter than a predetermined shutter time, the image taking means performs a photography in accordance with a third shooting mode to create a single photographic image under the proper shutter time without waiting for a determination result of the subject determining means, and when the proper shutter time computed by the proper shutter time computing means is longer than a predetermined shutter time, the image taking means performs, under the predetermined shutter time, a photography in accordance with the first shooting mode or the second shooting mode.

2. The image taking apparatus according to claim 1 further comprising notification means that notifies a user of a determination result by the subject determining means.

3. The image taking apparatus according to claim 1 further comprising recording means that records information indicative of a matter as to whether it is concerned with the single photographic image obtained by execution of the first shooting mode or the piled up image obtained by execution of the second shooting mode, in association with the single photographic image obtained by execution of the first shooting mode and the piled up image obtained by execution of the second shooting mode.

4. An image taking apparatus that images a subject on an imaging device to create an image representative of the subject, the image taking apparatus comprising:

through image creating means that repeatedly creates images before photography;

movement vector computing means that computes a movement vector for each of areas which are obtained by dividing each one of the images repeatedly created by the through image creating means into two or more areas, between the images;

designating means that designates a shooting mode from among two or more shooting modes;

subject determining means that determines whether the subject of a present photographic object is a still subject or a dynamic subject in accordance with the shooting mode designated by the designating means;

image taking means in which when the subject determined by the subject determining means is a dynamic subject, a photography is performed in accordance with a first shooting mode to create a single photographic image through increasing a photography sensitivity, and when the subject determined by the subject determining means is a still subject, a photography is performed in accordance with a second shooting mode to create a series of two or more photographic images;

image piling up means that, when the subject determined by the subject determining means is a still subject, creates a piled up image by adjusting each position of the two or more images obtained through performing the second shooting mode so that relative blurring is corrected between the two or more images, and then piling up the two or more images;

subject brightness detection means that detects a brightness of the subject; and proper shutter time computing means that computes a proper shutter time to perform a photography with a proper exposure in accordance with the brightness of the subject detected by the subject brightness detection means, wherein when the proper shutter time computed by the proper shutter time computing means is shorter than a predetermined shutter time, the image taking means performs a photography in accordance with a third shooting mode to create a single photographic image under the proper shutter time without waiting for a determination result of the subject determining means, and when the proper shutter time computed by the proper shutter time computing means is longer than a predetermined shutter time, the image taking means performs, under the predetermined shutter time, a photography in accordance with the first shooting mode or the second shooting mode.

5. The image taking apparatus according to claim 4 further comprising notification means that notifies a user of a determination result by the subject determining means.

6. The image taking apparatus according to claim 4 further comprising recording means that records information indicative of a matter as to whether it is concerned with the single photographic image obtained by execution of the first shooting mode or the piled up image obtained by execution of the second shooting mode, in association with the single photographic image obtained by execution of the first shooting mode and the piled up image obtained by execution of the second shooting mode.

* * * * *